(12) United States Patent
Krishnamoorthy et al.

(10) Patent No.: US 10,490,195 B1
(45) Date of Patent: Nov. 26, 2019

(54) USING SYSTEM COMMAND UTTERANCES TO GENERATE A SPEAKER PROFILE

(71) Applicant: Amazon Technologies, Inc., Seattle, WA (US)

(72) Inventors: Vishwanathan Krishnamoorthy, Lexington, MA (US); Sundararajan Srinivasan, Sunnyvale, CA (US); Spyridon Matsoukas, Hopkinton, MA (US); Aparna Khare, San Jose, CA (US); Arindam Mandal, Redwood City, CA (US); Krishna Subramanian, San Jose, CA (US); Gregory Michael Hart, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 2 days.

(21) Appl. No.: 15/716,411

(22) Filed: Sep. 26, 2017

(51) Int. Cl.
| | |
|---|---|
| *G10L 17/04* | (2013.01) |
| *G10L 17/22* | (2013.01) |
| *G10L 15/22* | (2006.01) |
| *G10L 15/18* | (2013.01) |
| *G06F 3/16* | (2006.01) |
| *G10L 13/00* | (2006.01) |

(52) U.S. Cl.
CPC .............. *G10L 17/04* (2013.01); *G06F 3/167* (2013.01); *G10L 13/00* (2013.01); *G10L 15/1815* (2013.01); *G10L 15/22* (2013.01); *G10L 17/22* (2013.01)

(58) Field of Classification Search
CPC ......... G10L 15/20; G10L 15/22; G10L 15/26; G10L 17/00; G10L 17/005; G10L 17/04
See application file for complete search history.

(56) References Cited

U.S. PATENT DOCUMENTS

| | | | | | |
|---|---|---|---|---|---|
| 6,163,768 | A | * | 12/2000 | Sherwood ............. | G10L 15/063 704/235 |
| 8,812,320 | B1 | * | 8/2014 | Roblek ................... | G10L 17/24 704/246 |
| 2003/0167169 | A1 | * | 9/2003 | Lewis .................... | G10L 15/063 704/260 |
| 2010/0106502 | A1 | * | 4/2010 | Farrell ................ | G07C 9/00158 704/246 |
| 2011/0182481 | A1 | * | 7/2011 | Dernis ................ | G06K 9/00892 382/116 |
| 2012/0130714 | A1 | * | 5/2012 | Zeljkovic ................ | G10L 17/24 704/235 |

(Continued)

*Primary Examiner* — Paras D Shah
(74) *Attorney, Agent, or Firm* — Price Atwood LLP

(57) ABSTRACT

Systems, methods, and devices related to establishing voice identity profiles for use with voice-controlled devices are provided. The embodiments disclosed enhance user experience by customizing the enrollment process to utilize voice recognition for each user based on historical information which can be used in the selection process of phrases a user speaks during enrollment of a voice recognition function or skill. The selection process can utilize phrases that have already been spoken to the electronic device; it can utilize phrases, contacts, or other personalized information it can obtain from the user account of the person enrolling; it can use any of the information just described to select specific words to enhance the probably of achieving higher phonetic matches based on words the individual user is more likely to speak to the device.

16 Claims, 12 Drawing Sheets

(56) References Cited

U.S. PATENT DOCUMENTS

| | | | |
|---|---|---|---|
| 2013/0225128 A1* | 8/2013 | Gomar | H04W 12/06 455/411 |
| 2014/0095169 A1* | 4/2014 | Summerfield | G10L 17/22 704/273 |
| 2014/0180697 A1* | 6/2014 | Torok | G06F 17/3074 704/275 |
| 2017/0221488 A1* | 8/2017 | Xiong | G10L 17/00 |
| 2018/0004925 A1* | 1/2018 | Petersen | G10L 17/04 |
| 2018/0315438 A1* | 11/2018 | Davies | G10L 21/0205 |
| 2018/0366124 A1* | 12/2018 | Cilingir | G10L 17/04 |
| 2019/0043509 A1* | 2/2019 | Suppappola | G10L 17/22 |

* cited by examiner

| | Set 1 | Set 2 | Set 3 | Set 4 | Set 5 |
|---|---|---|---|---|---|
| | Domain 1– 11 | Domain 2– 22 | Domain 1– 14 | Domain 3– 31 | Domain 1– 17 |
| | Domain 1– 12 | Domain 2 – 24 | Domain 2– 25 | Domain 3– 32 | Domain 1– 18 |
| | Domain 3– 33 | Domain 3– 33 | Domain 3– 37 | Domain 3– 36 | Domain 2– 21 |
| | Domain 3– 35 | Domain 3– 38 | Domain 3– 38 | Domain 4– 45 | Domain 2– 24 |
| | Domain 4– 42 | Domain 5– 56 | Domain 6– 65 | Domain 4– 46 | Domain 4– 48 |
| | Domain 6– 67 | Domain 5– 57 | Domain 6– 67 | Domain 6– 62 | Domain 7– 79 |
| | Domain 7– 73 | Domain 9– 98 | Domain 8– 83 | Domain 7– 77 | Domain 9– 97 |
| | Phonetic– 102 | Domain 9– 99 | Phonetic– 103 | Domain 8– 84 | Phonetic– 101 |
| | Phonetic– 105 | Phonetic– 102 | Phonetic– 105 | Phonetic– 103 | Phonetic– 104 |
| | Phonetic– 108 | Phonetic– 103 | Phonetic– 107 | Phonetic– 109 | Phonetic– 107 |

200 / 212 / 214 / 216 / 218 / 219 / 210

| SELECTED ENROLLMENT VECTOR | | | | | | | | | |
|---|---|---|---|---|---|---|---|---|---|
| 17 | 18 | 21 | 24 | 48 | 79 | 97 | 101 | 104 | 107 |

| Domain 1 | Domain 2 | Domain 3 | Domain 4 | Domain 5 | Domain 6 | Domain 7 | Domain 8 | Domain 9 | Phonetics |
|---|---|---|---|---|---|---|---|---|---|
| 1 | 2 | 3 | 4 | 5 | 6 | 7 | 8 | 9 | 10 |
| 11 | 12 | 13 | 14 | 15 | 16 | 17 | 18 | 19 | 20 |
| 21 | 22 | 23 | 24 | 25 | 26 | 27 | 28 | 29 | 30 |
| 31 | 32 | 33 | 34 | 35 | 36 | 37 | 38 | 39 | 40 |
| 41 | 42 | 43 | 44 | 45 | 46 | 47 | 48 | 49 | 50 |
| 51 | 52 | 53 | 54 | 55 | 56 | 57 | 58 | 59 | 60 |
| 61 | 62 | 63 | 64 | 65 | 66 | 67 | 68 | 69 | 70 |
| 71 | 72 | 73 | 74 | 75 | 76 | 77 | 78 | 79 | 80 |
| 81 | 82 | 83 | 84 | 85 | 86 | 87 | 88 | 89 | 90 |
| 91 | 92 | 93 | 94 | 95 | 96 | 97 | 98 | 99 | 100 |
| 101 | 102 | 103 | 104 | 105 | 106 | 107 | 108 | 109 | 110 |
| 111 | 112 | 113 | 114 | 115 | 116 | 117 | 118 | 119 | 120 |
| 121 | 122 | 123 | 124 | 125 | 126 | 127 | 128 | 129 | 130 |
| 131 | 132 | 133 | 134 | 135 | 136 | 137 | 138 | 139 | 140 |
| 141 | 142 | 143 | 144 | 145 | 146 | 147 | 148 | 149 | 150 |
| 151 | 152 | 153 | 154 | 155 | 156 | 157 | 158 | 159 | 160 |
| 161 | 162 | 163 | 164 | 165 | 166 | 167 | 168 | 169 | 170 |
| 171 | 172 | 173 | 174 | 175 | 176 | 177 | 178 | 179 | 180 |
| 181 | 182 | 183 | 184 | 185 | 186 | 187 | 188 | 189 | 190 |
| 191 | 192 | 193 | 194 | 195 | 196 | 197 | 198 | 199 | 200 |

SELECTED ENROLLMENT VECTOR

| 11 | 41 | 92 | 33 | 53 | 83 | 103 | 20 | 90 | 170 |
|---|---|---|---|---|---|---|---|---|---|

FIG. 2B

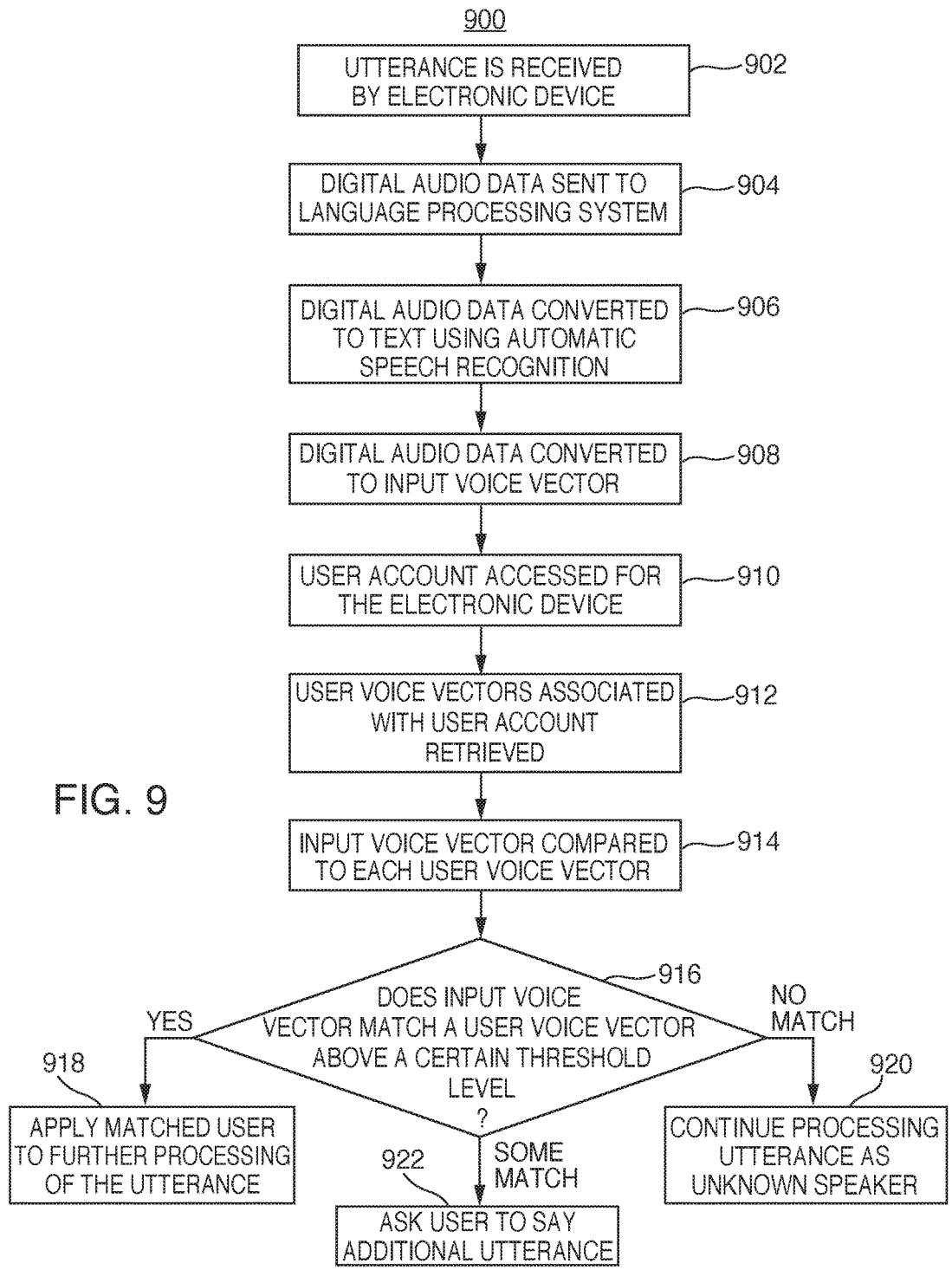

USING SYSTEM COMMAND UTTERANCES TO GENERATE A SPEAKER PROFILE

BACKGROUND

Electronic devices, such as audio (e.g., voice) controlled electronic devices, are capable of performing various functions. For instance, an individual may speak a command to activate such a device and in response, the device may perform various functions and/or cause one or more actions to be performed. Some voice-controlled electronic devices may also include display screens capable of outputting content. Often, the electronic devices cannot discern who the individual was that provided the spoken text.

BRIEF DESCRIPTION OF THE DRAWINGS

FIGS. 2A and 2B are illustrative diagrams of representative samples of information for establishing a speaker profile of a given individual speaking to an electronic device, in accordance with various embodiments of the present disclosure;

FIG. 9 is an illustrative diagram of a process for utilizing identity profiles of spoken text, in accordance with various embodiments.

DETAILED DESCRIPTION

Figure 1:
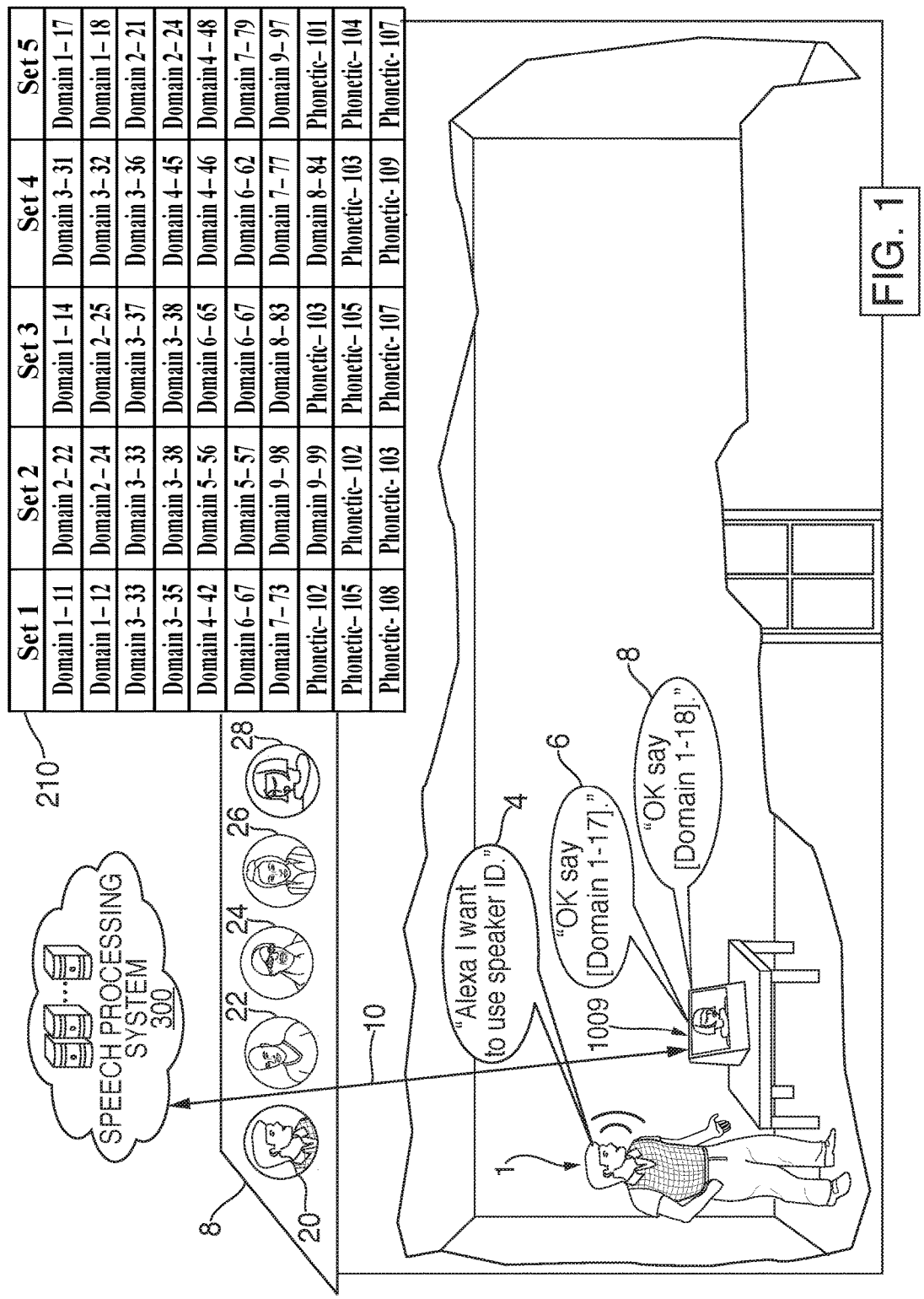
FIG. 1 is an illustrative diagram of an exemplary system for establishing a speaker profile, in accordance with various embodiments of the present disclosure.

The present disclosure, as set forth below, is generally directed to various embodiments of systems, methods, and devices related to establishing speaker profiles for use with voice-controlled devices. Devices such as Amazon's Echo are increasingly used by individuals for, among other things, communicating with friends, family, and associates, much like traditional land-line telephones had been used in earlier times. The most common way to use such devices is for an individual to say a special word as part of an utterance, often referred to as a "wakeword," that the device is designed to recognize. For instance, a user may speak the utterance, "Alexa, call Miriam" to a voice-controlled device while sitting in his or her bedroom. The user may have a list of contacts associated with a user account to which the voice-controlled device corresponds. Those contacts may be listed under the name "Miriam" (e.g., "Miriam Evans"). The electronic device would then attempt to place a call or communications to Miriam Evans. If the individual is like many people, however, there are likely to be one or more other people living in the same residence, in which case, the list of contacts associated with the account registered to the electronic device might not be correct for the person placing the call. For example, an Echo in a family home might be associated with the user account of the mother or the father, and many of the children's contacts may not be found on that account. Through innovation, new technical solutions are provided herein that can be used to identify the person placing the call through voice identification in order to help determine the correct intended recipient for a user's communications, or for whatever function the individual was requesting from the voice-controlled electronic device.

In some instances, voice identity or voice recognition, can be accomplished by having a user go through a series of training exercises with an electronic device. For example, once the user initiates the training session, the electronic device goes through a series of pre-stored training phrases and may ask the user to say each phrase multiple times in order to try to recognize the slight variations that may occur even in saying the same thing over and over. The electronic device might ask the user to say a trigger phrase or other type of wakeword a number of times, until the device establishes a baseline signal that represents that user saying the given phrase and accounts for variations that occurred in the different times the user spoke. In addition to having to repeat the phrase multiple times.

The present disclosure provides an innovative solution to voice recognition configuration that enhances the user experience by leveraging actual utterances having content that is divers and representative of commands that can be spoke to the system, while still having sufficient phonetic diversity to generate a speaker profile used to recognize the user when the user talks to the system. Further, some embodiments may customize the enrollment user experience based on historical information associated with a user profile. As such, the selection process of phrases a user goes through during enrollment of voice recognition. The selection process can utilize phrases that have already been spoken to the electronic device; it can utilize phrases, contacts, or other personalized information it can obtain from the user account of the person enrolling; it can use any of the information just described to select specific words to enhance the probably of achieving higher phonetic matches based on words the individual user is more likely to speak to the device. The ability of the system to modify the enrollment process for each user can be extremely robust in capability to vary the enrollment phrases depending on the level of detail known about the enrollee. Even if there is no information available about the specific individual enrolling, the advanced techniques described herein can provide that individual with a customized and more elegant enrollment process which can result in voice recognition operations having a higher likelihood of successfully matching the spoken phrase with the identity of the individual speaking.

The techniques disclosed herein leverage known data and information to customize the enrollment process in voice recognition for each individual. In one instance, a family may purchase an Echo, quickly set it up and start using it. As part of the setup process, one or more members of the household may go through the enrollment process to set up speaker profiles so that they can use voice identification with the Echo (or other voice-activated device). After a time, however, one or more other people in the household might decide to try to use the voice recognition features of the device to enhance their user experience. The system could leverage various information from the account associated with the device being used, such as the historical utterances that have already been utilized with that device, to create a customized enrollment process for the new individual that will result in a speaker profile that can be used with voice ID.

The enrollment process for enabling voice ID for use with a voice-activated device can be accomplished in different manners. It may be accomplished as part of original setup process, as described herein, such as when one or more individuals unpack the device, plug it in, and turn it on for the first time. In many instances, the setup process is accomplished through the use of a stand-alone companion app or application running on another device, such as a mobile phone or tablet device. The use is can, for example, make the process connecting the voice-activated device to a network, which usually requires selecting the network and entering a password for the network, simply, efficient and reliable. At the same time, the device can be registered to operate with one or more user accounts which can store individual user information, such as music preferences, playlists, contact lists, etc., which can then be accessed through voice commands to the device. An additional feature that may be available, depending on the specific voice-activated device being used, is voice recognition or voice ID, which can be used by the system to recognize which user is providing the spoken commands thereby enabling the system to easily access that specific user's profile and preferences, as well as user-specific information and settings Enrolling or enabling in voice ID requires the user to speak one or more utterances in order to train the device, which will result in a speaker profile being created for the user that enrolled. Once trained, the voice-activated device should recognize the identity of that user and take appropriate action. For example, if flash news briefing was enabled for voice ID, and the enrolled user simply stated "Alexa, play my flash briefing," the system would recognize which user spoke the utterance and play the flash news briefing based on the settings and selections for news that the user previously identified, even if there are multiple people using the same voice-activated device.

Enrollment in voice ID can be accomplished using the same stand-alone app or application that was used to initially setup the device itself, or it can be accomplished through voice commands. Using the stand-alone app approach, however, may provide some advantages and make the process of enrolling easier for the user. For example, it should be easier for the user enrolling to enter his or her individual account and login credentials using a stand-alone app (and it may be more secure, as the individual would not have to speak any security information, such as a password, out loud). It may also be easier for the user to read the training utterances that the system selects for each particular enrollment, instead of having to listen carefully as they are spoken by the voice-activated device. An additional advantage of using a stand-alone app is that the app could provide instantaneous, graphic feedback to the user as the training progresses, such as a color bar that changes from a starting color to bright green, as the process gets closer and closer to generating a speaker profile.

During enrollment, the system could select a subset of enrollment phrases that it knows are used regularly with the device being used for enrollment (or variants of such phrases), and mix in a subset of phonetic enrollment phrases selected based on the first subset to provide a well-rounded, broadly encompassing set of enrollment phrases. Then, given the familiarity that the user already has in speaking the phrases, the system could simply have the user say one or more of them a single time while it builds the speaker profile. For example, the user might go through a series of, for example, ten phrases, and the system could collect the audio data for each phrase and convert that data into audio energy information, such that the series of ten phrases could be collected and stored for that individual as a vector (i.e., a 1×10 array), and then a value could be calculated for the vector—the vector would be the speaker profile for that individual. In the future, when the user attempts to utilize voice recognition, that vector (or speaker profile) could be compared with a similar vector created from the spoken utterance. If a comparison of the vectors exceeds a threshold value, the system could treat that as a match and proceed accordingly.

In some instances, the new enrollee may have his or her own user account, in which case, the system could leverage known information about how the user has been using the system, such as specific utterances that individual has been using, to customize the user's enrollment process, both to enhance the user's experience, as well as to increase the likelihood that that user will be able to utilize the voice recognition feature in the future with a higher degree of confidence that the system will recognize him/her.

Information that might be leveraged in the event that the user does not have an individual account can include the history of utterances that the device being used for enrollment has experience in the past. For example, have most of the inquiries been related to the weather, or for daily flash briefings, or for the playing of music? The time of day that the attempted enrollment occurs might be utilized to limit the utterances reviewed to a temporal window, such as two hours before and two hours after the current enrollment is being attempted. Such a limit might help to establish which users use the electronic device at different times of day (for example, the working parent(s) may ask for a flash briefing before heading off to work, while other individuals may ask for music to be played when they get home from school at, for example, 3 pm). Other historical information that might be utilized to customize the enrollment process and to improve the likelihood of achieving successful voice recognition could include, for example common utterances for the city or neighborhood where the request was being made, or utterances that are common at the specific time of year that enrollment is occurring, or any of a variety of other types of information that can be acquired from the system.

FIG. 1 is an illustrative diagram of an exemplary system for establishing a speaker profile in accordance with various embodiments of the present disclosure. In a non-limiting, illustrative embodiment, an individual 1 in house 8 may wish to enroll in voice ID. Accordingly, individual 1 may speak an utterance 4, with the intention of requesting enrollment. For example, utterance 4 may be "Alexa I want to use speaker ID." In this example, the name "Alexa" may correspond to a wakeword for a voice activated electronic device 100a, the term "want to use" may correspond to an invocation phrase to initiate a command which, in this case, is to enroll in speaker ID.

Given the request, the system could go to the user account associated with device 100a, access voice ID training matrix 210 (which may be stored in language processing system 350), select a set of training utterances, and start playing the utterances in the selected set until enough data is acquired to create a speaker profile. For example, as shown in the illustration in FIG. 1, training matrix 210 includes five (5) sets of ten (10) utterances that were selected in accordance with the principles disclosed herein. Each set of training utterances can be compiled by selecting a variety of different subjects or domains, and then supplementing the selecting utterances with phonetic-focused utterances that are chosen to provide a high degree of phonetic diversity in the speaker profile.

The training utterances in each set can be selected based off of historical information that results in a speaker profile of greater fidelity, as well as being a profile that is more likely to result in successful voice matching during use. For example, the training utterances can be selected based on a mix of domain-based utterances that are commonly used together. For example, historical information may indicate that individuals that use a voice-activated device for daily news briefing also use their devices to play music. Accordingly, one set of utterances, such as Set 5, may be directed toward such individuals, where Domain 1 might be news, and domain 2 might be music.

As can be seen from the illustration in FIG. 1, out of all of the domains, only Domains 1 and 2 have more than one training utterance in set 5 (as described above, the selection of three phonetic utterances in Set 5 is accomplished to insure phonetic diversity in the speaker profile). Set 5 could be chosen at random out of the five sets without departing from the principles disclosed herein, because Set was constructed based on those principles—of utilizing historical utterance information in order to select more robust and reliable training utterances, that should result in a higher success rate of voice ID matches than through conventional voice recognition systems that typically use one or more set phrases for training which are often used regardless of the enrollee.

Voice ID reliability can be an important factor in providing an excellent user experience, and may be particularly important where multiple people are involved. For example, as shown in FIG. 1, household 8 includes five (5) individuals, which are illustrated as users 20, 22, 24, 26, and 28 (icons of which appear across the top of house 8). Each of those individuals might have their own account with their own setting preferences, particularly for applications or skills that are enabled for use with voice ID. Accordingly, another way to select improve the enrollment/training process, as well as overall voice ID success, in accordance with the principles disclosed herein, is to select the set of training utterances that includes utterances related to skills that are set to "voice ID enabled" on the device being used to enroll. In this manner, the enrollment process relies on utterances that are more likely to be used with voice ID because voice ID is already enabled.

As illustrated in FIG. 1, when individual 1 requests to be enrolled in voice ID, speech processing system 300 accessed enrollment matrix 210 (which may be stored in memory within system 300, such as memory 354). In the example shown, speech processing system 300 selected Set 5 to use for training, which includes two utterances from Domain 1 (utterances 17 and 18), two utterances from Domain 2 (utterances 21 and 24), one utterance from Domain 4 (utterance 48), one utterance from Domain 7 (utterance 79), one utterance from Domain 9 (utterance 97) and three phonetic utterances (101, 104, and 107) to provide phonetic diversity. Speech processing system 200, and in particular natural language understanding module 360, formats a series of commands in the format {"Okay, say"} {[specific utterance] }. The formatted responses are processed by text-to-speech module 364 and transmitted by to device 100a for playback to individual 1. For example, after individual 1 requests enrollment in voice ID, device 100a can then respond with audio output 6 "Okay, say [Domain 1-17]" (where [Domain X-Y] refers to a specific domain (X) and a specific utterance within that domain (such "as play my favorite music"). Once individual 1 responds appropriately, speech processing system 300 may prepare and transmit the next enrollment utterance (in this case Domain 1-18). This process continues until speech processing system 300 determines that the speaker profile is complete (not all ten training utterances need be spoken and input during each training exercise).

Once a user has been enrolled in voice ID, and has created a speaker profile (or speaker vector), speech processing system should be able to recognize that user when the user interacts with the system (through device 100a, for example). To illustrate, when an utterance is spoken, speech processing system 300 can determine that the utterance came from a device in which at least one user is enrolled in voice ID. Accordingly, as is described in more detail below, speech processing system 300 can process the received audio data corresponding to that utterance in two different ways. In one way, automatic speech recognition (ASR) techniques can be applied to the received audio data to convert that audio data into individual words. Then natural language understanding (NLU) processing can be utilized to determine the specific meaning of the utterance. In a different way, the audio data corresponding to the utterance can be converted to a vector representing a series of energy levels that correspond to at least a portion of the utterance. That vector can then compared by speech processing system 300 to speaker profiles (or vectors) stored as being associated with device 100a. Each of users 20, 22, 24, 26, and 28 in household 8 could go through the enrollment process in order to create a speaker profile, which would enable them to utilize speech recognition. In each instance, speech processing system 300 could utilize some historical information, in accordance with the principles described herein, in order to prepare a custom set of enrollment phrases for that individual to utter during enrollment. Accordingly, if each of users 20, 22, 24, 26, and 28 had gone through the enrollment process and created a speaker profile, then speech processing system 300 would play each user's specific "favorite playlist" if that user is the person speaking an utterance "Alexa, play my favorite playlist.".

The formation and use on an enrollment matrix is illustrated in FIGS. 2A and 2B, which provide two different examples of selecting varying enrollment utterances to use during enrollment. In each instance the, selection of utterances for enrollment purposes is made based, at least in part, on historical information related to previous use of particular utterances.

As shown in FIG. 2A, enrollment process 200 can utilize sample utterance matrix 210 to produce sample enrollment vector 220, that can be used to generate a speech profile for a given user. Sample utterance matrix 210 includes, as shown, five (5) sample sets of ten (10) utterances that are selected, in accordance with the principles of the present disclosure, to provide a customized enrollment experience to the user. Each set of utterances are prepared as a mix of utterances from a series of different domains, in an effort to achieve a broader range of utterances that might actually be used by the user, as well as to provide phonetic diversity so that voice ID performance based on the speaker profile created as part of process 200 will be reliable and predictable. In that manner, the individual user will gain confidence in the system, and may tend to interact with the system more regularly. For example, each set of sample utterances includes at least one utterance from four (4) different domains, as well as utterances chosen for phonetic diversity. The domain can be selected from a wide range of domains such as, music, weather, communications, sports, cooking, shopping, movies, etc.

As set forth in the example shown in FIG. 1, Set 5 was selected by speech processing system for the enrollment process for individual 1. Set 5 includes utterances from five (5) different domains, which are selected, at least in part, based on historical information, such as frequency of use of the utterances or substantially similar utterances. The format of the illustration show in FIGS. 1, 2A and 2B is to list a domain by number (e.g., Domain 2—which may be the music domain), followed by a numeric indication of a specific utterance (such as 21—"Play Jazz"). A different individual enrolling may enroll using completely different domains and utterances, or there may be some overlap between the utterances selected for each enrollment (for example, both Sets 1 and 2 include utterance Domain 3-33, even though the two sets are otherwise dissimilar). Once a set is selected for a given enrollment process, the utterances are copied to a selected enrollment vector, and the process of formatting those utterances for TTS processing and playback by device 100a continues. The processing of converting the audio data representing the responses by the individual into an actual iVector that represents the speaker profile for that user is described in more detail below with respect to FIGS. 4-7.

Another way in which enrollment process 200 may be accomplished in accordance with the principles of the present disclosure is illustrated in connection with FIG. 2B, in which enrollment system 200 includes sample utterance matrix 240 and at least one sample resultant enrollment vector 280. Sample utterance matrix 240 may be formed from any number of sample utterances that can be collected and categorized. Each column in matrix 240, unlike the columns of matrix 210 described above which represented sets, represents a homogeneous group of utterances that are organized by domain. For example, by way of example only, utterances that deal with regular communications might be Domain 1 in column 242, with speech processing system 300 may be designated by cells in the matrix ending with the numeral "1," while utterances related to weather related inquires might be Domain 2 in column 244 and may end in the numeral "2." Continuing in a similar manner, music-related utterances may be Domain 3 in column 246 having utterances ending in "3", movie related utterances as Domain 4 in column 248 (ending in "4"), TV related utterances as Domain 5 in column 250 (ending in "5"), shopping related utterances as Domain 6 in column 252 (ending in "6"), games related utterances as Domain 7 in column 254 (ending in "7"), book related utterances as Domain 8 in column 256 (ending in "8"), sports related utterances as Domain 9 in column 258 (ending in "9"), and phonetic related utterances in column 220 (ending in "0").

For each individual user enrolling, the utterance matrix can be utilized to select a sub-set of content-related utterances that are based, at least in part, on how the user has utilized the system historically in the past. For example, many users tend to settle on utilizing their voice-controlled devices in a relatively small number of different ways. For example, some users may utilize their device every day simply asking for the current weather and/or to play a certain type of music (e.g., "Alexa, play classic rock" or "Alexa, is it hot outside?"). In those instances, when the user goes through the enrollment process, a subset of enrollment utterances can be selected from the group of utterances that the user already utilizes to increase the confidence level that the enrollment will be successful. For example, if the user has been successfully providing utterances related to a specific subject area and has been successfully recognized by speech processing system 300, then it is more likely than not that the voice recognition enrollment using those utterances will lead to very high correlation of successfully matching the determined utterance with the spoken text, and therefore, with the user that spoke the text during enrollment.

In the example shown in FIG. 2B, speech processing system 300 selected two utterances from column 242 (communications), one utterance from column 244 (weather), and three utterances from column 246 (music) to form the content-related subset of enrollment utterances. Then, based on which utterances were already selected, speech processing system 300 selected three additional phonetic related utterances from column 260 (phonetics) to counter-balance the selected utterances to try to insure a wide coverage of the different parts of speech a user might utilize. In this case, the selection process may be based on the frequency with which the individual user utilized his/her electronic device 100a. For example, the sample user may have frequently asked what time it was, or for timers to be set (requests that might fall under general communications—column 242). That same user might also utilize device 100a for music playback and essentially nothing else. In that case, speech processing system 300 might have added in enrollment from column 244 (weather) in order to expose the individual to one or more of the commonly used features of electronic device 100a (and thereby speech processing system 300).

If speech processing system 300 determines that most of the phonetic range of spoken speech has been covered by the content-related subset of selected utterances, it may utilize less utterances from column 260 and may instead select an additional one or two utterances from the content columns. A similar result might occur if the user enrolling is a user that utilizes many features available from speech processing system 300 through device 100a. For example, if an individual user regularly utilizes device 100a to check the weather, to obtain flash new briefings, to listen to music, watch movies and TV shows, to shop, play games, read books and to inquire into sports, then the selected enrollment utterances for the elected enrollment vector may not need specific phonetic related utterances to get broad phonetic coverage to insure a high degree of voice recognition accuracy.

Depending on the circumstances, a variety of different factors may be utilized to select the subset of content related utterances. For example, even if a user does not have an individual account to utilize for historical information, the general historical set of utterances that have been invoked on the device 100a being used to enroll can provide a first level of increased probability that the enrolling user was responsible and has used the system accordingly. That set of utterances might be refined by limiting the historical utterances analyzed to a temporal window surrounding the time of enrollment (e.g., two hours before, two hours after), to increase the likelihood that the historical utterances being relied upon were spoken by the enrolling user.

Historical information may be utilized to improve the enrollment process and subsequent voice recognition matching of utterances even in a situation where a user took electronic device 100a out of the box and began the enrollment process immediately. In that situation, enrollment utterances could be selected from the most common utterances that have been used in that individual's city, neighborhood, region, state, country, etc. For example, some of the content related utterances selected might be related to ordering food from restaurants locally. Accordingly, when the user does order food to be delivered, there is an increased likelihood of successful voice recognition of the utterance. In other ways, relaying on utterances stored from local use may help speech processing system 300 to adopt to local accents of specific local terms of use, thereby improving the performance of subsequent speech recognition activities.

In the end, once the custom set of enrollment utterances are selected, they are formed into a vector (shown as the "Selected Enrollment Vector"), and saved for the enrolling user. The information stored in the vector represents measurements of audio energy related to at least portions of each selected utterance, and overall, generally represents audio of spoken speech for that individual. When a future utterance is made, the future utterance will be analyzed and turned into a similar vector (which may or may not include the entire spoken utterance), that can be compared to the Selected Enrollment Vector in order to determine whether a voice recognition match occurred.

Computing system 300 may include a speech-processing system that, in some embodiments, is configured to determine an intent of a spoken utterance using the received audio data, and generate a response to the utterance and/or cause one or more actions to be performed. For instance, upon receiving audio data representing utterance 4, the speech-processing system may generate text data representing the audio data by performing automatic speech recognition ("ASR") processing on the audio data to produce text data, and may utilize natural language understanding ("NLU") processing performed on the produced text data to determine an intent of the utterance. The speech-processing system may further determine that the intent of the utterance includes, for example, an intent to play a particular individual's favorite playlist. The process of determining the intent also may take as an input whether or not the specific device 100a has any users that have enrolled to use voice recognition. If there are such users, speech system 300 can analyze the received audio data for voice recognition determination, and prepare a voice recognition vector from the utterance data which can be compared to stored Selected Enrollment Vectors that are related via a user account to the individual device 100a.

If a comparison of the two vectors (i.e., the sample vector created from data related to spoken utterance 4, and each of the stored Selected Enrollment Vectors) results in a value that exceeds a given threshold, then a match has been determined and speech processing system continues processing the received utterance in the context that the utterance came from a specific individual. Accordingly, information such as the user's contact list, user's music, favorite selections, etc., may be accessed to improve the overall user experience. Once the individual is recognized, that individual will need less speech to successfully interact with speech processing system 300.

Figure 3:
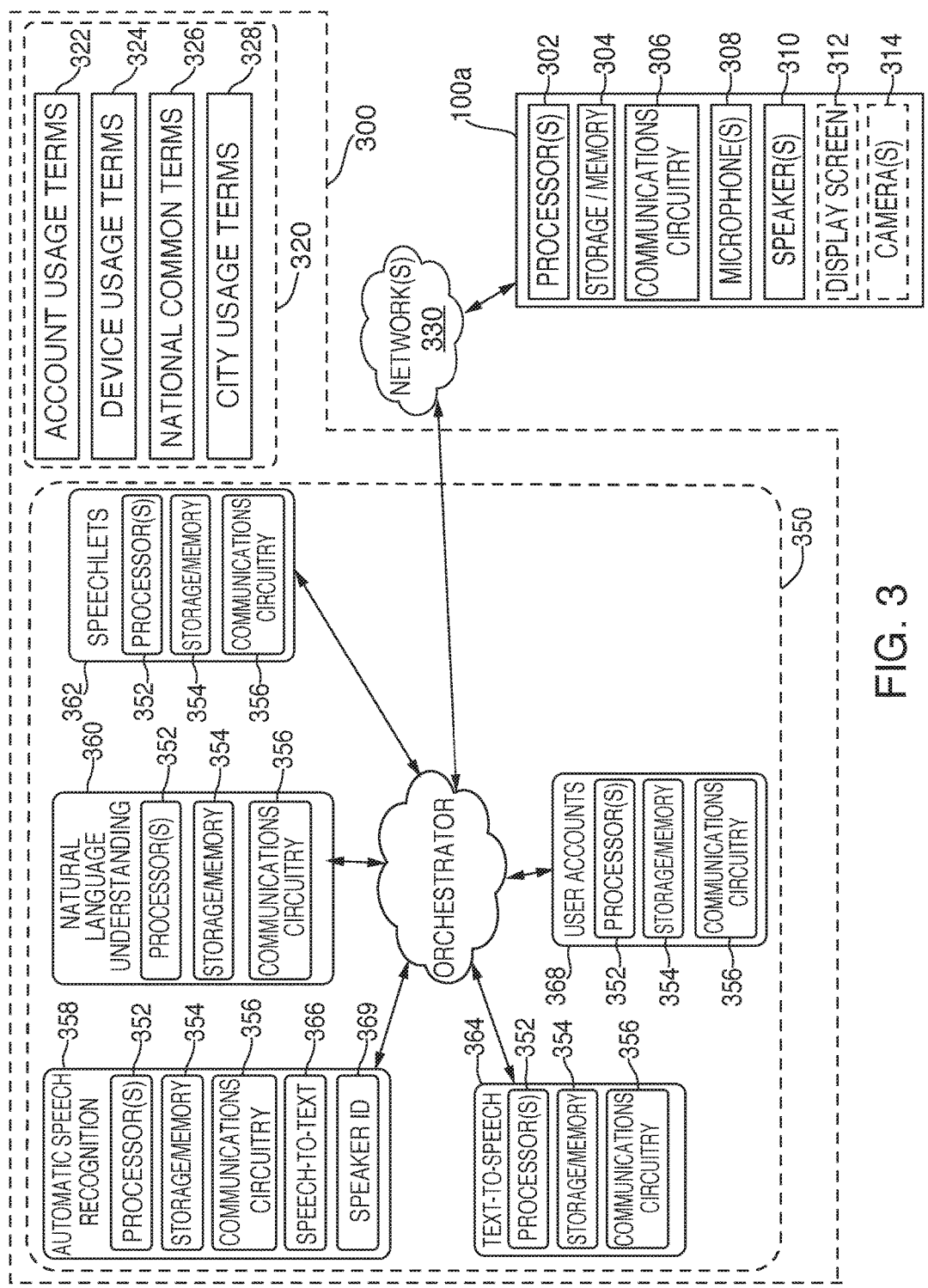
FIG. 3 is an illustrative diagram of an exemplary system architecture that can be utilized by, for example, the systems shown in FIG. 1 and FIGS. 2A and 2B, in accordance with various embodiments of the present disclosure.

FIG. 3 is an illustrative diagram of the exemplary system architecture of speech processing system 300 that can be used as described above in connection with FIGS. 1 and 2A and 2B, in accordance with various embodiments. While FIG. 3 primarily relates to speech processing system 300, FIG. 3 also shows representative components of electronic device 100a, which may be connected to speech processing system 300 wirelessly through, for example, network 330 (which may be, for example, a Wi-Fi network connected to the internet). Device 100a may, in some embodiments, include sound controlled functionality, such as one or more voice or sound activated components. In some embodiments, electronic device 100a may be configured such that it may communicate with speech processing system 300, and in particular the core speech-processing system 350, in response to detecting an utterance that includes a wakeword, which may subsequently be followed by a request, a question, a statement, or an intent, for instance. Similarly, electronic device 100a may alternatively or additionally include one or more manually activated components for manually controlled functionality.

In this particular scenario, electronic device 100a may also be configured, in some embodiments, to communicate with speech processing system 300, and in particular, core speech-processing system 350, in response to a manual input being detected by one or more input mechanisms, such as a touch screen, a button, and/or a switch, for example. The broader speech processing system 300 may be referred to below as simply computing system 300, and core system 350 may be referred to as speech processing system 350 (at least in part because the components contained within the dashed line labeled 350 represent the core, basic components used to provide voice-controlled functionality to users through voice-controlled devices such as 100a). For example, the components shown inside dashed line 350 receive audio data representing utterances from devices 100a, apply automatic speech recognition module 358 to that data to produce text data that is then analyzed by natural language understanding module 360. Additional functionality may be brought in via speechlets module 362 (such as voice recognition functionality). Resultant messages for the user are prepared by text-to-speech module 364. And access to user account can be provided by user account module 368. Utterance terms for populating a matrix such as the utterance matrix shown in FIG. 2 can be stored in voice recognition module 320, which can include specific provisions to store historical information regarding utterances made by account (sub-module 322), device (sub-module 324), geographic location (sub-module 326), or local region (sub-module 328).

In non-limiting embodiments, electronic device 100a may be capable of being activated in response to detecting a specific sound, such as a wakeword, as well as, or alternatively, via one or more inputs. After detecting a specific sound (e.g., a wakeword or trigger expression), electronic device 100a may recognize commands (e.g., audible commands, inputs, etc.) within captured audio, and may perform one or more actions in response to the received commands. Furthermore, electronic device 100a may also be configured to perform one or more actions in response to detecting a particular touch, or other mechanical inputs via electronic device 100a.

Electronic device 100a may correspond to any suitable type of electronic device including, but not limited to, desktop computers, mobile computers (e.g., laptops, ultrabooks), mobile phones, smart phones, tablets, televisions, set top boxes, smart televisions, personal display devices, large scale display devices (e.g., billboards, street signs, etc.), personal digital assistants ("PDAs"), gaming consoles and/or devices, smart furniture, smart household devices (e.g., refrigerators, microwaves, etc.), smart vehicles (e.g., cars, trucks, motorcycles, etc.), smart transportation devices (e.g., ships, trains, airplanes, etc.), wearable devices (e.g., watches, pins/broaches, headphones, etc.), and/or smart accessories (e.g., light bulbs, light switches, electrical switches, etc.). In some embodiments, electronic device 100a may be relatively simple or basic in structure such that no, or a minimal number of, mechanical input option(s)

(e.g., keyboard, mouse, track pad) or touch input(s) (e.g., touch screen, buttons) are included. For example, electronic device 100a may be able to receive and output audio, and may include power, processing capabilities, storage/memory capabilities, and communication capabilities. However, in other embodiments, electronic device 100a may include one or more components for receiving mechanical inputs or touch inputs, such as a touch screen and/or one or more buttons.

Electronic device 100a, in some embodiments, may include a minimal number of input mechanisms, such as a power on/off switch such that functionality of electronic device 100a may solely or primarily be through audio input and audio output. For example, electronic device 100a may include, or be in communication with, one or more microphones that listen for a wakeword by continually monitoring local audio. In response to the wakeword being detected, electronic device 100a may establish a connection with computing system 300 and/or speech-processing system 350, send audio data to computing system 300 and/or speech-processing system 350, and await/receive a response from computing system 300 and/or speech-processing system 350. In some embodiments, however, non-voice/sound activated devices may also communicate with computing system 300 and/or speech-processing system 350 (e.g., push-to-talk devices). For example, in response to a button or touch screen being pressed, or a button or touch screen being pressed and held, a microphone associated with electronic device 100a may begin recording local audio, and may establish a connection with computing system 300 and/or speech-processing system 350, send audio data representing the captured audio to computing system 300 and/or speech-processing system 350, and await/receive a response from computing system 300 and/or speech-processing system 350.

Persons of ordinary skill in the art will recognize that although in the illustrative embodiment, computing system 300 includes speech-processing system 350, this is merely exemplary, and speech-processing system 350 may be separate from computing system 300. For example, speech-processing system 350 may be located within a dedicated computing device, which may or may not be in communication with computing system 300 and/or one or more additional devices.

Electronic device 100a may include one or more processors 302, storage/memory 304, communications circuitry 306, one or more microphones 308 or other audio input devices (e.g., transducers), one or more speakers 310 or other audio output devices, a display screen 312, and one or more cameras 314 or other image capturing components. However, one or more additional components may be included within electronic device 100a, and/or one or more components may be omitted. For example, electronic device 100a may also include a power supply or a bus connector. As still yet another example, electronic device 100a may include one or more additional input and/or output mechanisms, such as one or more buttons, or one or more switches or knobs. As another example, electronic device 100a may lack a display screen. Furthermore, while electronic device 100a may include multiple instances of one or more components, for simplicity only one of each component has been shown.

In some embodiments, electronic device 100a may correspond to a manually activated device, or may include the functionality of a manually activated device. A manually activated device, as described herein, may correspond to a device that is capable of being activated in response to a manual input (e.g., pressing a button, touching a portion of a touch screen, performing an action on a device). For example, a tap-to-talk device is one type of manually activated device. Such tap-to-talk devices, for instance, are capable of obtaining and outputting audio data in response to a button being pressed.

In some embodiments, electronic device 100a may be in communication with an additional processing device including one or more of: processor(s) 302, storage/memory 304, communications circuitry 306, microphone(s) 308, speaker(s) 310, display screen 312, and/or camera(s) 314. For example, a centralized control device of electronic device 100a may include one or more microphone(s) 308. These microphone(s) 308 may receive audio input signals, which in turn may be sent to computing system 300 and/or speech-processing system 350 in response to a wakeword engine of electronic device 100a determining that a wakeword was uttered.

Processor(s) 302 may include any suitable processing circuitry capable of controlling operations and functionality of electronic device 100a, as well as facilitating communications between various components within electronic device 100a. In some embodiments, processor(s) 302 may include a central processing unit ("CPU"), a graphic processing unit ("GPU"), one or more microprocessors, a digital signal processor, or any other type of processor, or any combination thereof. In some embodiments, the functionality of processor(s) 302 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 302 may include its own local memory, which may store program modules, program data, and/or one or more operating systems. However, processor(s) 302 may run an operating system ("OS") for electronic device 100a, and/or one or more firmware applications, media applications, and/or applications resident thereon. In some embodiments, processor(s) 302 may run a local client script for reading and rendering content received from one or more websites. For example, processor(s) 302 may run a local JavaScript client for rendering HTML or XHTML content received from a particular URL accessed by electronic device 100a.

Storage/memory 304 may include one or more types of storage mediums such as any volatile or non-volatile memory, or any removable or non-removable memory implemented in any suitable manner to store data for electronic device 100a. For example, information may be stored using computer-readable instructions, data structures, and/or program modules. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 304 may be implemented as computer-readable storage media ("CRSM"), which may be any available physical media accessible by processor(s) 302 to execute one or more instructions stored within storage/memory 304. In some embodiments, one or more applications (e.g., gaming, music, video, calendars, lists, etc.) may be run by processor(s) 302, and may be stored in memory 304.

In some embodiments, storage/memory 304 may store one or more audible and/or visual messages to be provided to electronic device 100a for indicating that a communications session is about to end if speech is not detected. For example, storage/memory 304 may store one or more audible messages and/or GUIs that include a counter that counts down from a preset time until zero, at which point the communications session may end.

In some embodiments, storage/memory 304 may include a media system 316, which may be configured to facilitate communications between electronic devices 100a and computing system 300. For example, media system 316 may store one or more communications protocols that may be executed by processor(s) 302 for facilitating communications for device 100a. In some embodiments, a sessions initiation protocol ("SIP") may be used to facilitate media transfer between electronic device 100a and one or more of computing system 300 (e.g., communications system 328) and another electronic device 100a. SIP, for example, is an application layer protocol that is text based, and may employ Real-time Transport Protocol ("RTP") or Secure Real-time Transport Protocol ("SRTP") functions. In particular, PJSIP communications functionality may be employed by media system 316 to support audio, video, presence, and messaging communications for electronic device 100a. In some embodiments, a Web Real-Time Communications ("WebRTC") protocols may be employed by electronic device 100a. In a non-limiting embodiment, media system 316 may include instructions that indicate which communications protocols to employ for facilitating media transfer between devices based on a device type of electronic device 100a. For example, if electronic device 100a does not include display 312 and/or camera 314, then media system 316 may indicate that PJSIP should be used, whereas if electronic device 100 includes display 312 and/or camera 314 then media system 316 may indicate that WebRTC protocols should be used.

In some embodiments, storage/memory 304 may include one or more modules and/or databases, such as a speech activity detection system (described in greater detail below with reference to speech activity detection system 322), a speech recognition module, a wakeword database, a sound profile database, and a wakeword detection module. The speech recognition module may, for example, include an automatic speech recognition ("ASR") component that recognizes human speech in detected audio. The speech recognition module may also include a natural language understanding ("NLU") component that determines user intent based on the detected audio. Also included within the speech recognition module may be a text-to-speech ("TTS") component capable of converting text to speech to be outputted by speaker(s) 310, and/or a speech-to-text ("STT") component capable of converting received audio signals into text to be sent to computing system 300 and/or speech-processing system 350 for processing.

The wakeword database may be a database stored locally by storage/memory 304 of electronic device 100a, and may include a list of current wakewords for electronic device 100a, as well as one or more previously used, or alternative, wakewords electronic device 100a. In some embodiments, an individual may set or program a wakeword for their electronic device 100a. The wakeword may be programmed directly on electronic device 100a, or a wakeword or wakewords may be set by the individual via a local client application that is in communication with computing system 300 and/or speech-processing system 350. For example, an individual may use their mobile device having the speech-processing system application running thereon to set the wakeword. The specific wakeword may then be communicated from the mobile device to speech-processing system 350, which in turn may send/notify electronic device 100a of the individual's selection for the wakeword. The selected activation may then be stored in the wakeword database of storage/memory 304. In some embodiments, additional trigger expressions or permutations of the wakeword may also be stored within storage/memory 304. For example, specific trigger expressions or words that indicate the presence of the wakeword may also be stored within storage/memory 304. In some embodiments, audio watermarks, indicating a specific action or message, may also be stored within storage/memory 204.

In some embodiments, sound profiles for different words, phrases, commands, or audio compositions are also capable of being stored within storage/memory 304, such as within a sound profile database. For example, a sound profile of audio may be stored within the sound profile database of storage/memory 304 on electronic device 100a. In this way, if a particular sound (e.g., a wakeword or phrase) is detected, a corresponding command or request may be ignored, for example. A sound profile, for example, may correspond to a frequency and temporal decomposition of a particular audio file or audio portion of any media file, such as an audio fingerprint or spectral representation.

The wakeword detection module may include an expression detector that analyzes an audio signal produced by microphone(s) 308 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 308. Rather than producing a transcription of words of the speech, a keyword spotter generates a true/false output (e.g., a logical 1/0) to indicate whether or not the predefined word or expression was represented in the audio signal. In some embodiments, an expression detector may be configured to analyze the audio signal to produce a score indicating a likelihood that the wakeword is represented within the audio signal detected by microphone(s) 308. The expression detector may then compare that score to a wakeword threshold to determine whether the wakeword will be declared as having been spoken.

In some embodiments, a keyword spotter may use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An HMM model represents a word as a series of states. Generally, a portion of an audio signal is analyzed by comparing its HMM model to an HMM model of the trigger expression, yielding a feature score that represents the similarity of the audio signal model to the trigger expression model.

In practice, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, electronic device 100a may then begin transmitting the audio signal to speech-processing system 350 for detecting and responds to subsequent utterances made by an individual.

Communications circuitry 306 may include any circuitry allowing or enabling one or more components of electronic device 100a to communicate with one another, one or more additional devices, servers, and/or systems. For example, communications circuitry 306 may facilitate communications between electronic device 100a and computing system 300. As an illustrative example, audio data representing an utterance (e.g., utterance 4 of FIG. 1) may be transmitted over a network 330, such as the Internet, to computing system 300 using any number of communications protocols. For example, network(s) 330 may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and wireless application protocol ("WAP"), are some of the various types of protocols that may be used to facilitate communications between electronic device 100a and computing system 300. In some embodiments, electronic device 100a and computing system 300 and/or one or more additional devices or systems (e.g., speech-processing system 350) may communicate with one another via a web browser using HTTP. Various additional communication protocols may be used to facilitate communications between electronic device 100a and computing system 300, including, but not limited to, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network protocol), infrared, BitTorrent, FTP, RTP, RTSP, SSH, and/or VOIP.

Communications circuitry 306 may use any communications protocol, such as any of the previously mentioned exemplary communications protocols. In some embodiments, electronic device 100a may include an antenna to facilitate wireless communications with a network using various wireless technologies (e.g., Wi-Fi, Bluetooth, radiofrequency, etc.). In yet another embodiment, electronic device 100a may include one or more universal serial bus ("USB") ports, one or more Ethernet or broadband ports, and/or any other type of hardwire access port so that communications circuitry 306 allows electronic device 100a to communicate with one or more communications networks.

Electronic device 100a may also include one or more microphones 308 and/or transducers. Furthermore, one or more microphones located within a separate device may be in communication with electronic device 100a to capture sounds for electronic device 100a. Microphone(s) 308 may be any suitable component capable of detecting audio signals. For example, microphone(s) 308 may include one or more sensors for generating electrical signals and circuitry capable of processing the generated electrical signals. In some embodiments, microphone(s) 308 may include multiple microphones capable of detecting various frequency levels. As an illustrative example, electronic device 100a may include multiple microphones (e.g., four, seven, ten, etc.) placed at various positions about electronic device 100a to monitor/capture any audio outputted in the environment where electronic device 100a is located. The various microphones 308 may include some microphones optimized for distant sounds, while some microphones may be optimized for sounds occurring within a close range of electronic device 100a. In some embodiments, microphone(s) 308 may only begin to detect audio signals in response to a manual input to electronic device 100a. For example, a manually activated device may begin to capture audio data using microphone(s) 308 in response to a user input, such as pressing a button, tapping a touch screen, or providing any touch input gesture to a touch input component.

Electronic device 100a may include one or more speakers 310. Furthermore, electronic device 100a may be in communication with one or more speaker(s) 310. Speaker(s) 310 may correspond to any suitable mechanism for outputting audio signals. For example, speaker(s) 310 may include one or more speaker units, speaker housings, transducers, arrays of speakers, and/or arrays of transducers that may be capable of broadcasting audio signals and or audio content to a surrounding area where electronic device 100a may be located. In some embodiments, speaker(s) 310 may include headphones or ear buds, which may be wirelessly wired, or hard-wired, to electronic device 100a, that may be capable of broadcasting audio directly to an individual.

In some embodiments, one or more microphones 308 may serve as input devices to receive audio inputs. Electronic device 100a, in the previously mentioned embodiment, may then also include one or more speakers 310 to output audible responses. In this manner, electronic device 100a may function solely through speech or audio, without the use or need for any input mechanisms or displays, however this is merely exemplary.

Display screen 312 may correspond to a display device and/or touch screen, which may be any size and/or shape and may be located at any portion of electronic device 100a. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display device including capacitive sensing panels capable of recognizing touch inputs thereon. For instance, display screen 312 may correspond to a projected capacitive touch ("PCT"), screen include one or more row traces and/or driving line traces, as well as one or more column traces and/or sensing lines. In some embodiments, display screen 312 may be an optional component for electronic device 100a. For instance, electronic device 100a may not include display screen 312. Such devices, sometimes referred to as "headless" devices, may output audio, or may be in communication with a display device for outputting viewable content.

Display screen 312, in one non-limiting embodiment, may include an insulator portion, such as glass, coated with a transparent conductor, such as indium tin oxide ("InSnO" or "ITO"). In general, one side of the touch screen display may be coated with a conductive material. A voltage may be applied to the conductive material portion generating a uniform electric field. When a conductive object, such as a human finger, stylus, or any other conductive medium, contacts the non-conductive side, typically an outer surface of display screen 312, a capacitance between the object and the conductive material may be formed. Processor(s) 202 may be capable of determining a location of the touch screen associated with where the capacitance change is detected, and may register a touch input as occurring at that location.

In some embodiments, display screen 312 may include multiple layers, such as a top coating layer, a driving line layer, a sensing layer, and a glass substrate layer. As mentioned previously, the glass substrate layer may correspond to an insulator portion, while the top coating layer may be coated with one or more conductive materials. The driving line layer may include a number of driving lines, and the sensing layer may include a number of sensing lines, which are described in greater detail below. Persons of ordinary skill in the art will recognize that one or more additional layers, or spaces between layers, may be included. Furthermore, persons of ordinary skill in the art will recognize that any number of driving lines and sensing lines for driving the line layer and the sensing layer, respectively, may be used.

In some embodiments, the driving lines and the sensing lines of the driving line layer and the sensing line layer, respectively, may form a number of intersection points, where each intersection functions as its own capacitor. Each sensing line may be coupled to a source, such that a charge is provided to each sensing line, and changes in capacitance of a particular driving line and sensing line are detectable thereby. In response to a conductive object being brought proximate, or substantially touching an outer surface of the top coating layer, a mutual capacitance of a particular capacitor (e.g., an intersection point) may reduce in magnitude. In other words, a voltage drop may be detected at a location on display screen 312 corresponding to where a conductive object contacted display screen 312.

A change in capacitance may be measured to determine a location on the touch screen where the object has contacted the surface. For example, if an individual touches a point on display screen 312, then a corresponding driving line and sensing line that intersect at that point may be identified. A location of the point may have one or more pixels associated with that location, and therefore one or more actions may be registered for an item or items that are displayed at that location. Processor(s) 302 of electronic device 100a may be configured to determine which pixels are associated with a particular location point, and which item or items are also displayed at that pixel location. Furthermore, electronic device 100a may be configured to cause one or more additional actions to occur to the item or items being displayed on display screen 312 based on a temporal duration the touch input, and or if one or more additional touch inputs are detected. For example, an object that contacted display screen 312 at a first location may be determined, at a later point in time, to contact display screen 312 at a second location. In the illustrative example, an object may have initially contacted display screen 312 at the first location and moved along a particular driving line to the second location. In this scenario, a same driving line may have detected a change in capacitance between the two locations, corresponding to two separate sensing lines.

The number of driving lines and sensing lines, and therefore the number of intersection points, may directly correlate to a "resolution" of a touch screen. For instance, the greater the number of intersection points (e.g., a greater number of driving lines and sensing lines), the greater precision of the touch input. For instance, a touch screen display screen 312 having 100 driving lines and 100 sensing lines may have 100 intersection points, and therefore 100 individual capacitors, while a touch screen display screen 212 having 10 driving lines and 10 sensing lines may only have 10 intersection points, and therefore 10 individual capacitors. Therefore, a resolution of the touch screen having 100 intersection points may be greater than a resolution of the touch screen having 10 intersection points. In other words, the touch screen having 100 intersection points may be able to resolve a location of an object touching the touch screen with greater precision than the touch screen having 10 intersection points. However, because the driving lines and sensing lines require a voltage to be applied to them, this may also mean that there is a larger amount of power drawn by electronic device 100, and therefore the fewer driving lines and/or sensing lines used, the smaller the amount of power that is needed to operate the touch screen display.

In some embodiments, display screen 312 may correspond to a high-definition ("HD") display. For example, display screen 312 may display images and/or videos of 720p, 1080p, 1080i, or any other image resolution. In these particular scenarios, display screen 312 may include a pixel array configured to display images of one or more resolutions. For instance, a 720p display may present a 1024 by 768, 1280 by 720, or 1366 by 768 image having 786,432; 921,600; or 1,049,088 pixels, respectively. Furthermore, a 1080p or 1080i display may present a 1920 pixel by 1080 pixel image having 2,073,600 pixels. However, persons of ordinary skill in the art will recognize that the aforementioned display ratios and pixel numbers are merely exemplary, and any suitable display resolution or pixel number may be employed for display screen 312, such as non-HD displays, 4K displays, and/or ultra high definition displays.

In some embodiments, electronic device 100a may include one or more cameras 314, corresponding to any suitable image capturing component or components capable of capturing one or more images and/or videos. Camera(s) 314 may, in some embodiments, be configured to capture photographs, sequences of photographs, rapid shots (e.g., multiple photographs captured sequentially during a relatively small temporal duration), videos, or any other type of image, or any combination thereof. In some embodiments, electronic device 100a may include multiple cameras 314, such as one or more front-facing cameras and/or one or more rear facing cameras. Furthermore, camera(s) 314 may be configured to recognize far-field imagery (e.g., objects located at a large distance away from electronic device 100a) or near-filed imagery (e.g., objected located at a relatively small distance from electronic device 100a). In some embodiments, the camera(s) may be high-definition ("HD") cameras, capable of obtaining images and/or videos at a substantially large resolution (e.g., 726p, 1080p, 1080i, etc.). In some embodiments, camera(s) 214 may be optional for electronic device 100a. For instance, camera(s) 314 may be external to, and in communication with, electronic device 100a. For example, an external camera may be capable of capturing images and/or video, which may then be provided to electronic device 100a for viewing and/or processing.

It should be recognized that, in some embodiments, display screen 312 and/or camera(s) 314 may be optional for electronic device 100a. For instance, electronic device 100a may function using audio inputs and outputting audio, and therefore display screen 312 and/or camera(s) 314 may not be included. Furthermore, in some embodiments, electronic device 100a may not include display screen 312 and/or camera(s) 314, but instead may be in communication with display screen 312 and/or camera(s) 314. For example, electronic device 100a may be connected to a display screen via a Wi-Fi (e.g., 802.11 protocol) connection such that visual content sent to electronic device 100a may be sent to the display screen, and output thereby.

In one exemplary embodiment, electronic device 100a may include an additional input/output ("I/O") interface. For example, electronic device 100a may include one or more input components capable of receiving user inputs. Various types of input components may include, but are not limited to, keyboards, buttons, switches, a mouse, joysticks, or an external controller may be used as an input mechanism for the I/O interface. In some embodiments, the output portion of the I/O interface of electronic device 100a may include one or more lights, light emitting diodes ("LEDs"), or other visual indicator(s). Persons of ordinary skill in the art will recognize that, in some embodiments, one or more features of the output portion of the I/O interface may be included in a purely voice activated version of electronic device 100a. For example, one or more LED lights may be included on electronic device 100a such that, when microphone(s) 308 receives audio, the one or more LED lights become illuminated signifying that audio has been received by electronic device 100a. In some embodiments, one or more vibrating mechanisms or other haptic features may be included with electronic device 100a to provide a haptic response to an individual.

In some embodiments, electronic device 100a may include radio-frequency identification ("RFID") functionality and/or near field communication ("NFC") functionality. Furthermore, in some embodiments, electronic device 100a may include one or more infrared ("IR") sensors and one or more IR emitters. The IR sensors/emitters may be used to determine depth information. For example, in some embodiments, a distance of an individual from electronic device 100 may be determined using the one or more IR sensors/emitters. Depth determination may be performed using any depth determination technique. In some embodiments, a distance between an individual and electronic device 100a may be employed as a basis for presenting content with varying density using display screen 312. For example, when an individual is at a distance A from electronic device 100a, electronic device 100a may display weather data for a current day. However as the user moves closer to electronic device 100a, such as at a distance B from electronic device 100a, which may be less than distance A, electronic device 100a may display weather data for a current week. For instance, as the individual gets closer to electronic device 100a, the ability of the individual to see denser content increases, and as the individual moves father away from electronic device 100a, the individual's ability to see denser content decreases. This, for example, may ensure that the content displayed by electronic device 100a is continually relevant and readable by the individual.

Computing system 300, in a non-limiting, exemplary embodiment, may include speech-processing system 350. However, in other embodiments, speech-processing system 350 may be separate from, or in communication with, computing system 300. Generally, speech-processing system 350 may, in some embodiments, include one or more remote devices capable of receiving and sending content from/to one or more electronic device, such as electronic device 100a. Speech-processing system 350 may include various components and modules including, but not limited to, ASR module 358, NLU module 360, functionalities module 362, TTS module 364, and user accounts module 368. In some embodiments, speech-processing system 350 may also include computer readable media, including, but not limited to, flash memory, random access memory ("RAM"), and/or read-only memory ("ROM"). Speech-processing system 350 may also include various modules that store software, hardware, logic, instructions, and/or commands for speech-processing system 350, such as a speaker identification ("ID") module, or any other module, or any combination thereof.

ASR module 358 may be configured to recognize human speech in detected audio, such as audio captured by microphone(s) 308 which may then be transmitted to speech-processing system 350. ASR module 358 may include, in some embodiments, one or more processor(s) 352, storage/memory 354, and communications circuitry 356. Processor(s) 352, storage/memory 354, and communications circuitry 356 may, in some embodiments, be substantially similar to processor(s) 302, storage/memory 304, and communications circuitry 306, which are described in greater detail above, and the aforementioned descriptions may apply. In some embodiments, ASR module 358 may include speech-to-text ("STT") module 366. STT module 366 may employ various speech-to-text techniques. However, techniques for transcribing speech into text are well known in the art and need not be described in further detail herein, and any suitable computer implemented speech to text technique may be used to convert the received audio signal(s) into text, such as SOFTSOUND speech processing technologies available from the Autonomy Corporation, which is headquartered in Cambridge, England, United Kingdom.

ASR module 358 may include an expression detector that analyzes audio signals received by speech-processing system 350, such as the expression detector mentioned above with regards to electronic device 100a. Such an expression detector may be implemented using keyword spotting technology, as an example. A keyword spotter is a functional component or algorithm that evaluates an audio signal to detect the presence of a predefined word or expression, such as a passphrase or other sound data, within the audio signals. Rather than producing a transcription of words of the speech, a keyword spotter generates a true/false output (e.g., a logical 1/0) to indicate whether or not the predefined word or expression was represented in the audio signal. In some embodiments, an expression detector may be configured to analyze the audio signal to produce a score indicating a likelihood that the wakeword or phrase is represented within the audio signal. The expression detector may then compare that score to a threshold value to determine whether the wakeword or phrase will be declared as having been spoken.

ASR module 358 also may include speaker ID module 369 that can process the received audio data in order to try to determine the identity of the individual that spoke the utterance that was converted into audio data. The process for performing speaker ID is shown in more detail in connection with FIGS. 4-7, and described in more detail below. In general, however, and consistent with various embodiments described throughout the present disclosure, the received audio data can be processed in two ways simultaneously by ASR modules 358. In one process, the received audio data can be converted to text and passed on to NLU module 360 (which, as described above, determines the intent of the text), while in another process, the received audio data is processed to produce a speech profile that may be referred to as an input iVector. ASR module 358, or more specifically, speaker ID sub-module 369 within ASR module 358, processes the received audio data into an input iVector and compares the input iVector with iVectors stored associated with currently identified user account (see user accounts 368 and the description herein). If the comparison results in a value that exceeds a predetermined threshold, a match is declared and the identity of the speaker is associated with identity of the iVector that matched the input iVector.

NLU module 360 may be configured such that it determines user intent based on the received audio data. For example, NLU module 360 may determine that the intent of utterance 4 in FIG. 1 is for initiating a communications session with a device, associated with a particular entity name (e.g., initiate a communications session with "Cruise"). In response to determining the intent of the utterance, NLU module 360 may communicate the received command to an appropriate subject matter server or skill on functionalities module 362 to perform one or more tasks, and/or retrieve an appropriate response or response information. NLU module 360 may include processor(s) 352, storage/memory 354, and communications circuitry 356 which, in some embodiments, may be substantially similar to processor(s) 302, storage/memory 304, and communications circuitry 306 of electronic device 100a, and the previous description may apply.

Functionalities module 362 may, for example, correspond to various action specific systems or servers, sometimes referred to as "skills," capable of processing various task specific actions. Functionalities module 362 may further correspond to first party applications and/or third party applications capable of performing various tasks or actions. For example, based on the context of the audio received from electronic device 100a, speech-processing system 350 may use a certain functionality to generate a response, or to obtain response information, which in turn may be communicated back to electronic device 100a. For instance, an utterance may ask to communicate with another individual (and that individual may be associated with a user account represented by an entity name), and therefore functionalities module 362 may access communications system 328 (or in some embodiments, third party messaging applications) to obtain contact information relating to user accounts and devices associated with or belonging to the user account associated with electronic device 100a. Functionalities module 362 may also include processor(s) 352, storage/memory 354, and communications circuitry 356.

TTS module 364 may employ various text-to-speech techniques. However, techniques for transcribing speech into text are well known in the art and need not be described in further detail herein, any suitable computer implemented speech to text technique may be used to convert the received audio signal(s) into text, such as SOFTSOUND speech processing technologies available from the Autonomy Corporation, which is headquartered in Cambridge, England, United Kingdom. TTS module 364 may also include processor(s) 352, storage/memory 354, and communications circuitry 356.

User accounts module 368 may store one or more user profiles corresponding to users having a registered account on computing system 300. For example, a parent may have a registered account on computing system 300, and each of the parent's children may have their own user profile registered under the parent's registered account. Information, settings, and/or preferences, for example, for each user profile may be stored within a user profile database. In some embodiments, user accounts module 368 may store a voice signal, such as voice biometric information, for a specific user profile. This may allow speaker identification techniques to be used to match a voice-to-voice biometric data associated with a specific user profile. In some embodiments, user accounts module 368 may store a telephone number assigned to a particular user profile.

Additionally, in some embodiments, user accounts module 368 may store contacts associated with a particular user account and/or user profile. Further, in some embodiments, contacts stored in user accounts module may include telephone numbers (i.e., public switched telephone network ("PSTN" contacts), usernames and other information associated with third party messaging networks, and internal user accounts associated with first party messaging networks. Further still, in some embodiments, user accounts module 368 may store devices belonging to a particular user account and/or user profile.

In some embodiments, user accounts module 368 may store entity names that were assigned by a user to represent any nicknamed device that the user sees fit. For instance, a device located in the bedroom of a family member named "Aaron" may receive the entity name "Aaron," "Aaron's Room," "Aaron's Echo," "Aaron's Echo Show," "Aaron's Echo Dot," "Superstar," or any other entity name assigned by a user to represent the device. User accounts 368 may also store a list of users associated with the nicknamed devices.

In some embodiments, user accounts module 368 may store entity names that were assigned to represent any group of contacts and/or devices. For instance, a user may collectively assign PSTN contacts (i.e., telephone contacts) of his or her family members the entity name "Home," "Family," or any other entity name. As another example, a user may collectively assign devices belonging to his or her user account (each of which belonging to himself/herself and/or a member of his/her family) the entity name "Home," "Family," or any other entity name. As another example, user accounts module 368 may store a combination of PSTN contacts, devices, and first party messaging contacts collectively as one entity name.

Persons of ordinary skill in the art will recognize that although each of ASR module 358, NLU module 360, functionalities module 362, TTS module 364, and user accounts module 368 may each include instances of processor(s) 352, storage/memory 354, and communications circuitry 356, and those instances of processor(s) 352, storage/memory 354, and communications circuitry 356 within each of ASR module 358, NLU module 360, functionalities module 362, TTS module 364, and user accounts module 368 may differ. For example, the structure, functionality, and style of processor(s) 352 within ASR module 358 may be substantially similar to the structure, functionality, and style of processor(s) 352 within NLU module 360, however the actual processor(s) 352 need not be the same entity.

Figure 4A:
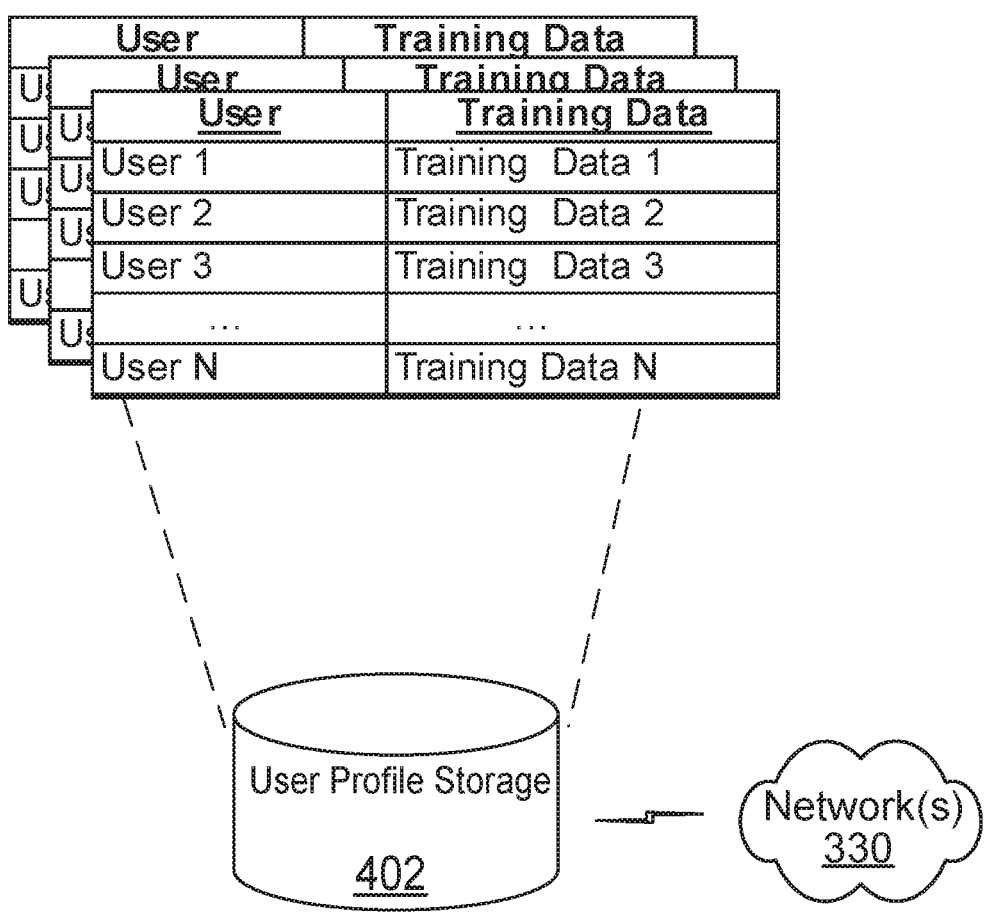
FIG. 4A illustrates data stored and associated with speaker profiles, in accordance with various embodiments of the present disclosure.

FIG. 4A illustrates a user profile storage 402 that includes data regarding users of a device. The user profile storage 402 may be located proximate to the processors/server(s) 352, or may otherwise be in communication with various components of system 300, for example over the network 330. The user profile storage 402 may include a variety of information related to individual users, accounts, etc. that interact with system 300, such as the training data shown as associated with each user. In an example, the user profile storage 402 is a cloud-based storage. For illustration, as shown in FIG. 4A, the user profile storage 402 may include data regarding multiple users of a single speech-controlled device 100a (or other device). Each user indicated in a user profile associated with a speech-controlled device 100a may be associated with training data corresponding to training spoken utterances of the respective user, such as training data 705 discussed below. In addition or alternatively, each user indicated in the user profile associated with a speech-controlled device 100a may be associated with feature/vector data corresponding to training data of the respective user. Further, each user may have a user ID that identifies the specific user for further system processing.

Figure 4B:
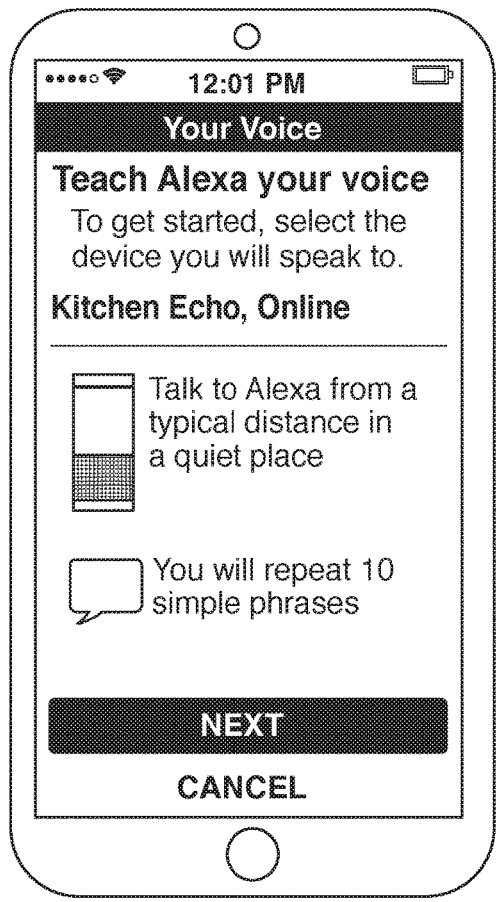
FIGS. 4B-4D illustrate the training process that may occur when utilizing a companion app running on an electronic device, in accordance with various embodiments of the present disclosure.
Figure 4C:
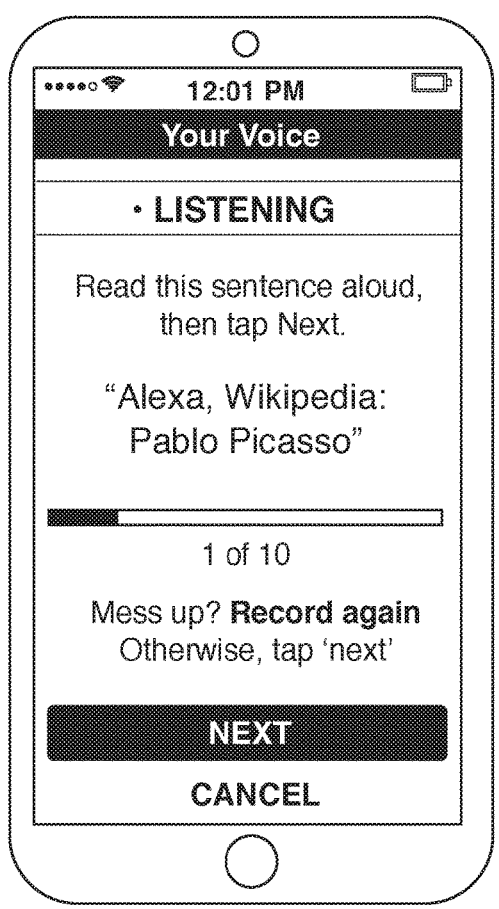
Figure 4D:
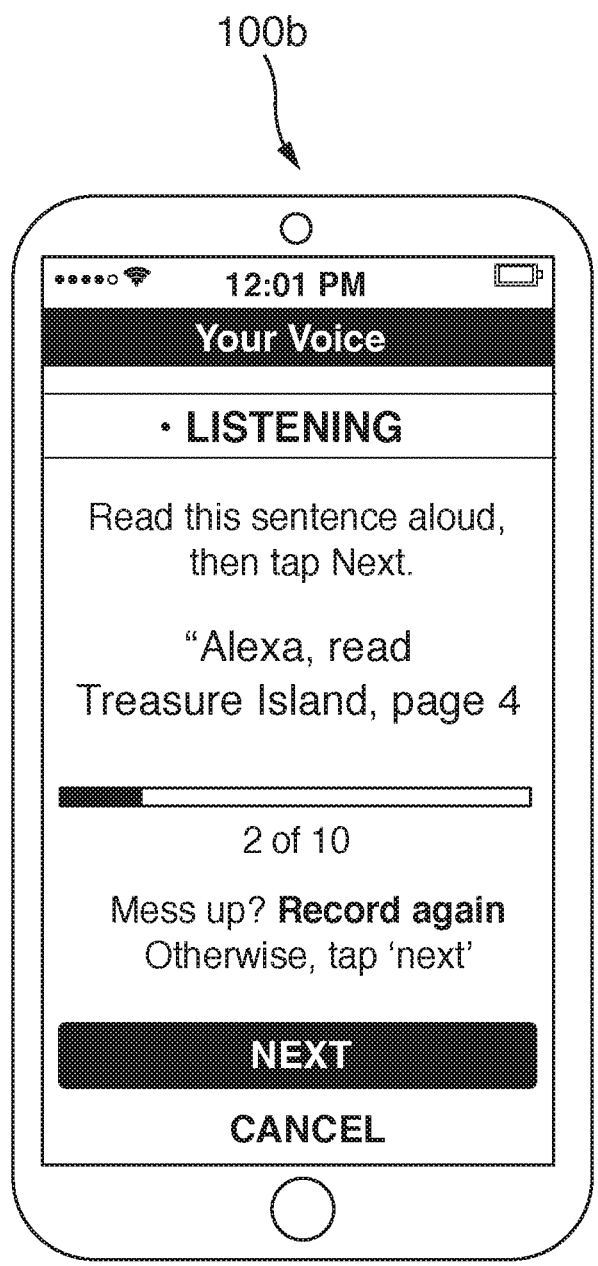

FIGS. 4B-4D illustrate utilizing the training data shown in FIG. 4A on a companion app running on, for example, mobile phone 100b, during a speaker ID enrollment process for a given new user (or a user that decides to go through the enrollment process again). As shown in FIG. 4B, the enrollment begins with an introductory screen which provides basic instructions and expectations to a given user, such as "select the device you will speak to," and "Talk to Alexa from a typical distance in a quiet place", and "You will repeat 10 simple phrases" (as described herein, the enrollment process may not require the user to go through all 10 phrases in order to be complete—once speaker ID submodule 369 is satisfied that a distinct iVector can be generated (as described in connection with FIGS. 4-7), the enrollment process may be terminated even if all ten phrases have not been processed. FIG. 4C illustrates the process of using one example of training data during the enrollment. As shown in FIG. 4C, device 100b provides an indication that it is the voice-activated device is "Listening," as the text on the companion app requests that the used speak the utterance "Alexa, Wikipedia: Pablo Picasso." The user is instructed to tap "Next" after being satisfied with the recording of, in this case, the first training data. FIG. 4D illustrates enrollment utilizing a second sample of training data, in this case: "Alexa, read Treasure Island, page 4." Again, the user is instructed to either tap "Record Again" or "Next" depending on whether the user believes the recording was done correctly. Moreover, while the sample screenshots of device 100b indicate that there are ten recordings that must be spoken, as described herein in connection with various embodiments, the speaker ID system may determine that enough utterances have been processed in order to create a sufficiently unique iVector for the given individual speaking, in which case the system could then stop the enrollment process early.

Figure 5:
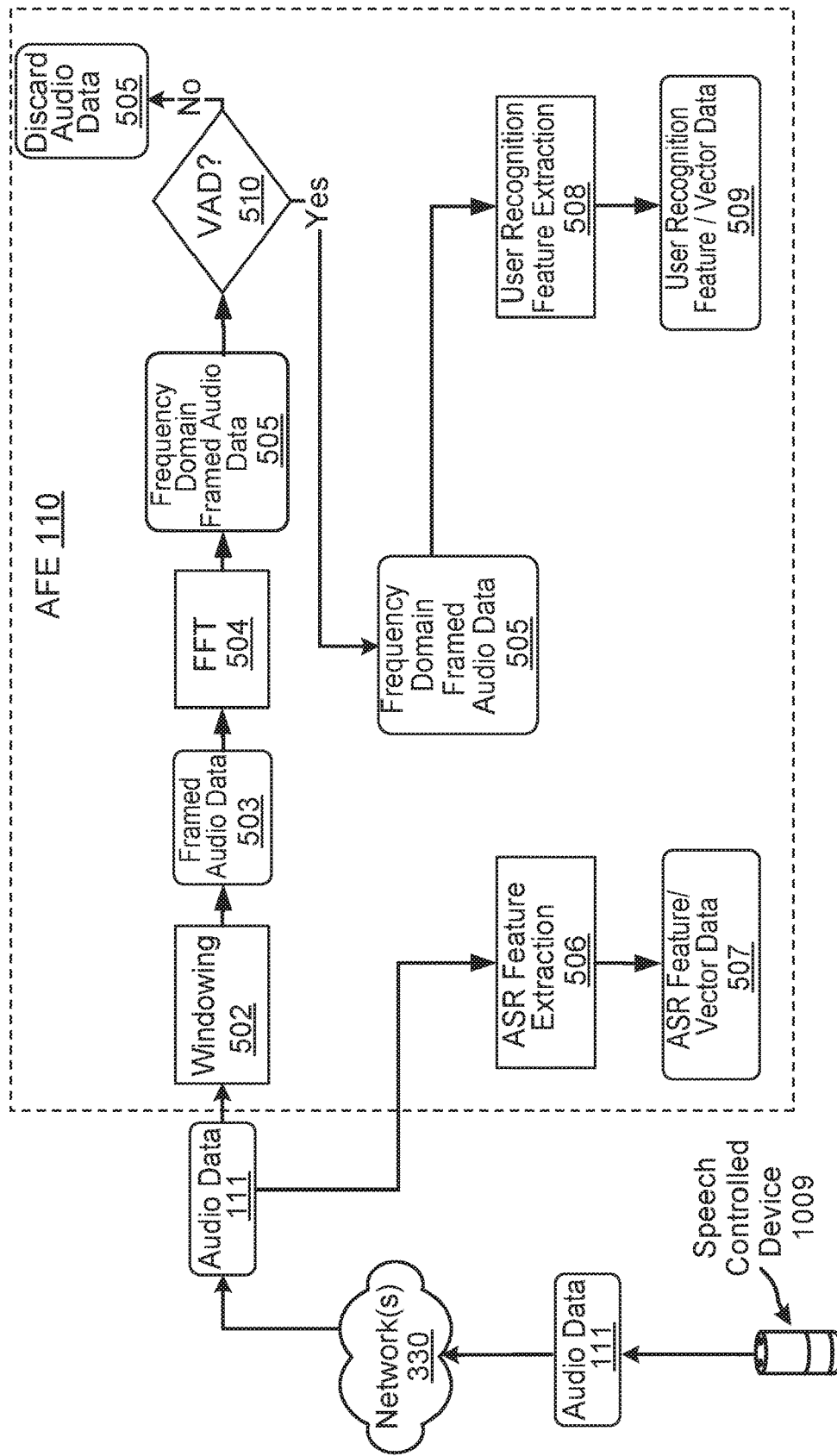
FIG. 5 is a flow diagram illustrating processing performed to prepare audio data for ASR and user recognition, in accordance with various embodiments of the present disclosure.

FIG. 5 illustrates processing performed to prepare audio data for ASR module 358 and user recognition. The speech-controlled device 100a sends audio data 111 through a network(s) 330 to the server(s) 352 for processing. The server(s) 352 may include an acoustic front end (AFE) 110 (or other component(s)) that performs various functions on the incoming audio data 111 to prepare the incoming audio data 111 for further downstream processing, such as ASR and/or user recognition. For example, the AFE 110 may perform (502) windowing functions on the audio data 111 to create framed audio data 503 (e.g., waveforms). The size of each frame may depend upon implementation. In an example, each frame may include twenty-five (25) milliseconds (m/s) of audio data, with an overlap of the next frame of 10 ms of data, thus resulting in sliding window processing of audio data. Performing a windowing function may include multiplying a time record by a finite-length window with an amplitude that varies smoothly and gradually toward zero at its edges. By performing such, the endpoints of the waveforms of respective frames of audio data meet, resulting in a continuous waveform without sharp transitions. The AFE 110 may then perform (504) a fast Fourier transform (FFT) that converts the waveforms in each frame of the framed audio data 503 from its original domain (e.g., time) to a representation in a frequency domain (thereby creating frequency domain framed audio data 505). Audio processing techniques other than or in addition to FFT may be used to transform audio data (e.g., waveforms) into data that can be processed as needed.

The processors/server(s) 352 (through the AFE 110 or using another component) then detects (510) whether voice activity (i.e., speech) is present in the post-FFT waveforms (i.e., frequency domain framed audio data 505). In doing so the processors/server(s) 352 may perform VAD operations discussed above. The VAD detector 510 (or other components) may also be configured in a different order, for example the VAD detector 510 may operate on input audio data 111 rather than on frequency domain framed audio data 505, may operate on ASR features, etc. Various different configurations of components are possible. If there is no speech in the audio data, the processors/server(s) 352 discards the frequency domain framed audio data 505 (i.e., removes the audio data from the processing stream). If, instead, the processors/server(s) 352 detects speech in the frequency domain framed audio data 505, the processors/server(s) 352, performs user recognition feature extraction (508) on the frequency domain framed audio data 505. User recognition feature extraction (508) may include performing frame level feature extraction and/or utterance level feature extraction.

The frame level feature extraction may determine which frame of a universal background model (UBM) the frame corresponds to. The UBM may be a Gaussian mixture model, a deep neural network, etc. The utterance level feature extraction may analyze aligned speech frames to derive feature vectors of fixed length (i.e., the user recognition feature/vector data 509). The feature extraction may continue until voice activity is no longer detected in the input audio data, at which point the processors/server(s) 352 may determine that an endpoint of the speech has been reached processing with respect thereto. ASR feature extraction (506) may be performed on all the audio data 111 received from the speech-controlled device 100a. Alternatively (not illustrated), ASR feature extraction (506) may only be performed on audio data including speech (as indicated by the VAD 510). ASR feature extraction (506) and user recognition feature extraction (508) involve determining values (i.e., features) representing qualities of the frequency domain framed audio data 505, along with quantitating those features into values (i.e., feature vectors or audio feature vectors). ASR feature extraction (506) may determine ASR feature/vector data 507 useful for ASR processing, and user recognition feature extraction (508) may determine user recognition feature/vector data 509 useful for user recognition. The ASR feature/vector data 507 and the user recognition feature/vector data 509 may be the same features/vectors, different features/vectors, or may include some overlapping features/vectors. A number of approaches may be used to extract features/vectors from the frequency domain framed audio data 505, such as MFCCs, PLP techniques, neural network feature vector techniques, linear discriminant analysis, semi-tied covariance matrices, or other approaches known to those skilled in the art.

Typically, the ASR feature/vector data 507 may include a different audio feature vector for each audio frame. Thus, for one 25 ms long audio frame, the ASR feature extraction component 506 may output a single ASR feature vector. The ASR feature vectors 507 output by the ASR feature extraction component 506 may be output to an ASR module 358 to perform speech recognition.

Depending on system configuration, the user recognition feature extraction component 508 may output multiple user recognition feature vectors, for example one such vector for each audio frame. Alternatively, the user recognition feature extraction component 508 may continue to input the frequency domain framed audio data 505 while the utterance is ongoing (e.g., before the endpoint of the speech is reached in the audio data 505). While the audio data 505 for the utterance is input, the user recognition feature extraction component 508 may accumulate or otherwise combine the audio data 505 as it comes in. That is, for a certain frame's worth of audio data 505 that comes in, the user recognition feature extraction component 508 may combine that frame's worth of data to the previous data received for the particular utterance. The particular method of accumulation may vary, including using an arithmetic component, a recurrent neural network (RNN), trained model, or other component capable of combining audio data. Further, the form of combination performed by the user recognition feature extraction component 508 may depend on what audio qualities are determined to be important for ultimate user recognition. Thus, the user recognition feature extraction component 508 may be trained to isolate and process data that is most useful for user recognition. The output of the user recognition feature extraction component 508 may thus include user recognition feature/vector data 509 that includes values for features useful for user recognition. The resulting user recognition feature/vector data 509 may then be used for user recognition.

Figure 6:
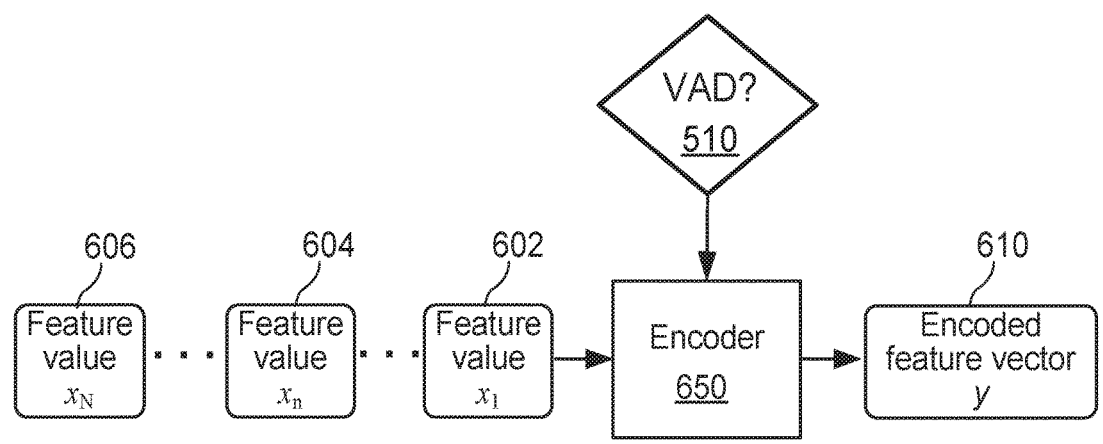
FIG. 6 is a diagram of a vector encoder, in accordance with various embodiments of the present disclosure.

The user recognition feature/vector data 509 may include multiple vectors each corresponding to different portions of the input utterance. Alternatively, the user recognition feature/vector data 509 may be a single vector representing audio qualities of the input utterance. Referring to FIG. 6, the single vector may be created using an encoder 650 which can create a fixed-size vector to represent certain characteristics of the audio data entities as described below. In mathematical notation, given a sequence of feature data values $x_1, \ldots x_n, \ldots x_N$, with $x_n$ being a D-dimensional vector, an encoder $E(x_1, \ldots x_N)=y$ projects the feature sequence to y, with y being a F-dimensional vector. F is a fixed length of the vector and is configurable depending on use of the encoded vector and other system configurations. As shown in FIG. 6, feature values 602 through 606 (which may include feature vectors of audio data 111, frequency domain framed audio data 505, or the like) may be input into an encoder 650 which will output an encoded feature vector 610 that represents the input feature values.

The VAD 510 may be an input into the encoder 650 such that the encoder 650 may only operate when feature values input therein correspond to speech. The individual feature values (e.g., 602-606) may correspond to specific audio frames. Regardless of how many feature values are input, any particular encoder 650 will be configured to output vectors of the same size, thus ensuring a continuity of output encoded vector size from any particular encoder 650 (though different encoders may output vectors of different fixed sizes) and enabling comparing different feature vectors y. The value y may be called an embedding of the sequence $x_1, \ldots x_N$. The length of $x_n$ and y are fixed and known a-priori, but the length of N of feature sequence $x_1, \ldots x_N$ is not necessarily known a-priori. The encoder E may be implemented as a neural network (NN), recurrent neural network (RNN), GMM, or other model. One particular example is a long short-term memory (LSTM) RNN. There are a variety of ways for the encoder 650 to consume the encoder input, including but not limited to:

linear, one direction (forward or backward),
  bi-linear, essentially the concatenation of a forward and a backward embedding, or
  tree, based on parse-tree of the sequence.

In addition, an attention model can be used, which is another RNN or deep neural network (DNN) that learns to "attract" attention to certain parts of the input. The attention model can be used in combination with the above methods of consuming the input.

FIG. 6 illustrates operation of the encoder 650. The input feature value sequence, starting with feature value $x_1$ 602, continuing through feature value $x_n$ 604 and concluding with feature value $x_N$ 606 is input into the encoder 650. The encoder 650 may process the input feature values as noted above. The encoder 650 outputs the encoded feature vector y 610, which is a fixed length feature vector of length F. Thus, the user recognition feature extraction component 508 may include an encoder 650 that receives audio feature values for a particular utterance as input, and outputs a fixed length encoded feature vector y 610, which may be the user recognition feature/vector data 509. Thus, in certain system configurations, no matter how long the utterance is, or how many acoustic frames worth of feature values are input into the encoder 650, the output feature vector 610/509 will be of the same length, thus allowing for more ease of performing user recognition by the user recognition module. To allow for robust system operation a final vector 509 may include many dimensions (e.g., several hundred), thus providing many data points for downstream consideration.

To determine the user recognition feature/vector data 509, the system may (for example using VAD detector 510) determine that voice activity is detected in input audio. This may indicate the beginning of the utterance, thus resulting in the system determining that the input utterance starts at a first point in audio data. Audio processing (for example by windowing 502, FFT 504, ASR feature extraction 506, user recognition feature extraction 508, ASR module 355, or the like) may continue on the utterance audio data starting at the first point and continuing until the VAD detector 510 determines that voice activity is no detected at a second point in audio data. Thus, the system may determine that the input utterance ends at the second point. Thus, the first point may be considered the beginpoint of the utterance and the second point may be considered the endpoint of the utterance. The VAD detector 510, or other component, may signal the user recognition feature extraction component 508 when the beginpoint and/or endpoint is detected so that the user recognition feature extraction component 508 may begin processing audio data starting at the beginpoint and ending at the endpoint. Further, audio frames during the utterance that do not include speech may be filtered out by the VAD detector 510 and thus not considered by the ASR feature extraction 506 and/or user recognition feature extraction 508. The resulting accumulated/processed speech audio data for the utterance (from beginpoint to endpoint) may then be represented in a single feature vector for the user verification feature/vector data 509, which may then be used for user recognition.

Figure 7:
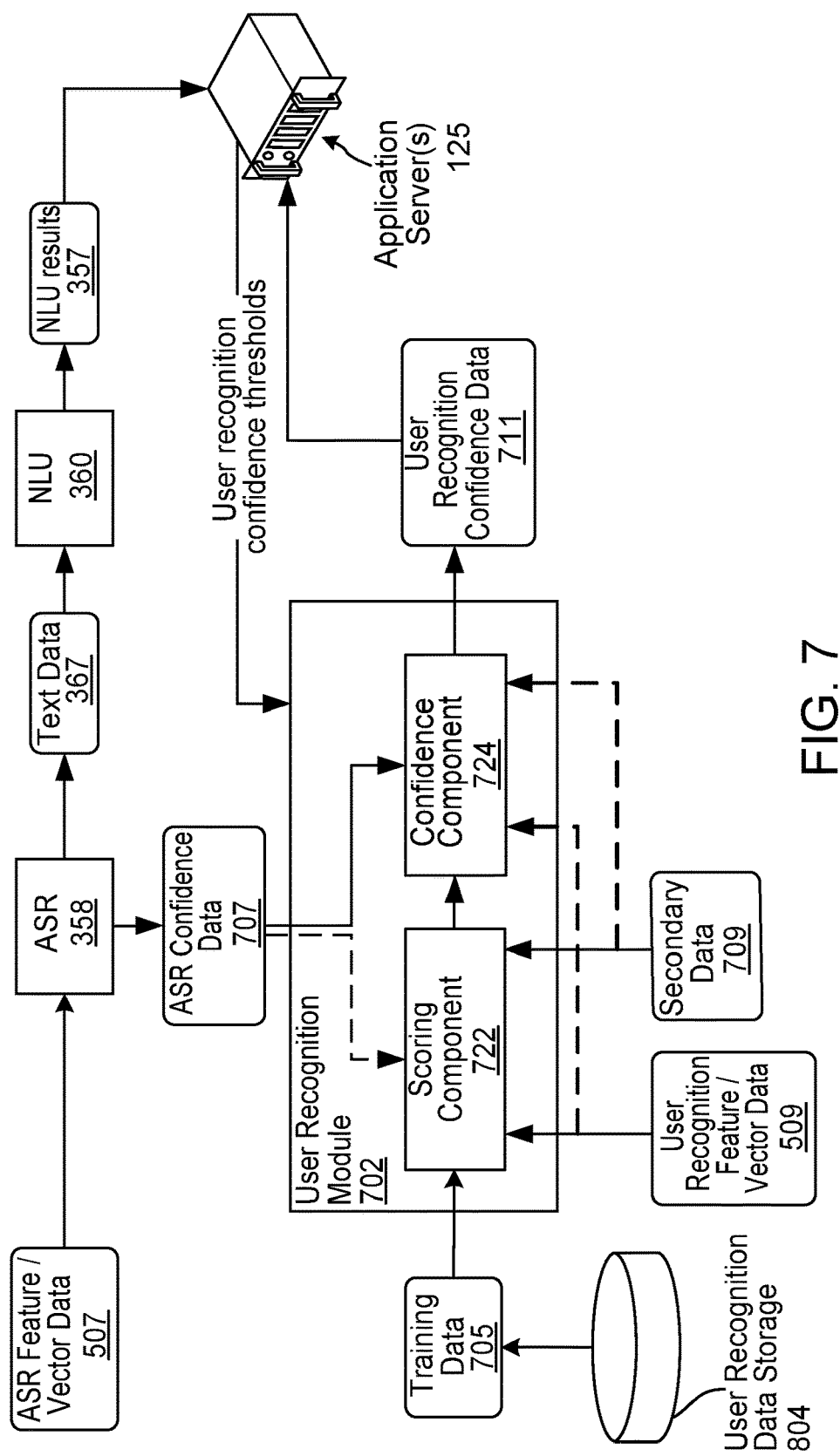
FIG. 7 is a system flow diagram illustrating user recognition, in accordance with various embodiments of the present disclosure.

FIG. 7 illustrates user verification as performed by the processors/server(s) 352. The ASR module 358 performs ASR on the ASR feature/vector data 507 as described above. ASR output (i.e., text data 367) is then processed by the NLU module 360 as described above. The ASR confidence data 707 may then be passed to a user recognition module 702.

The user recognition module 702 of the processors/server(s) 352 performs user recognition using various data including the user recognition feature/vector data 509 and training data 705 which may correspond to sample audio data corresponding to known users, the ASR confidence data 707 and secondary data 709. The user recognition module 702 may then output user recognition confidence data 711 which reflects a certain confidence that the input utterance was spoken by one or more particular users. The user recognition confidence data 711 may not indicate access privileges of the user(s). The user recognition confidence data 711 may include an indicator of the verified user (such as a user ID corresponding to the speaker of the utterance) along with a confidence value corresponding to the user ID, such as a numeric value or binned value as discussed below.

The training data 705 may be stored in a user recognition data storage 704. The user recognition data storage 704 may be stored by the processors/server(s) 352, or may be a separate device. Further, the user recognition data storage 704 may be part of user profile storage 402. The user recognition data storage 704 may be a cloud-based storage. The training data 705 stored in the user recognition data storage 704 may be stored as waveforms and/or corresponding features/vectors. The training data 705 may correspond to data from various audio samples, each audio sample associated with a known user and/or user identity. For example, each user known to the system may be associated with some set of training data 705 for the known user. The user recognition module 702 may then use the training data 705 to compare against incoming audio data (represented by user recognition feature/vector data 509) to determine the identity of a user speaking an utterance. The training data 705 stored in the user recognition data storage 704 may thus be associated with multiple users of multiple devices. Thus, the training data 705 stored in the storage 704 may be associated with both a user that spoke the respective utterance, as well as the speech-controlled device 100a that captured the respective utterance.

The training data 705 for a particular user may include a feature vector of the same size as a vector of the user recognition feature/vector data 509. Thus, for example, if a feature vector 509 is of size F (for example encoded by encoder 650), the training data 705 may also be a feature vector of size F. To create such a training data feature vector, during a training period the system may either prompt a user to speak sample audio data or may identify sample audio data known to have been spoken by a particular user. The system may then process the sample audio data (for example into feature values such as 602-606 and then by encoder 650) to create sample training data 705 (e.g., a feature vector of size F). The training data 705 may then be stored by the system (such as in data storage 704) and saved for use during runtime user verification processing.

To perform user recognition, the user recognition module 702 may determine the speech-controlled device 100a from which the audio data 111 originated. For example, the audio data 111 may include a tag indicating the speech-controlled device 100a. Either the speech-controlled device 100a or the processors/server(s) 352 may tag the audio data 111 as such. The tag indicating the speech-controlled device 100a may be associated with the user recognition feature/vector data 509 produced from the audio data 111. The user recognition module 702 may send a signal to the user recognition data storage 704, with the signal requesting only training data 705 associated with known users of the speech-controlled device 100a from which the audio data 111 originated. This may include accessing a user profile associated with the speech-controlled device 100a and then only inputting training data 705 associated with users corresponding to the user profile of the device 100a. This limits the universe of possible training data the recognition module 702 should consider at runtime when verifying a user and thus decreases the amount of time to perform user recognition by decreasing the amount of training data 705 needed to be processed. Alternatively, the user recognition module 702 may access all (or some other subset of) training data 705 available to the system. However, accessing all training data 705 will likely increase the amount of time needed to perform user recognition based on the magnitude of training data to be processed.

If the user recognition module 702 receives training data 705 as an audio waveform, the user recognition module 702 may determine features/vectors of the waveform(s) or otherwise convert the waveform into a data format that can be used by the user recognition module 702 to actually perform the user recognition. The user recognition module 702 may then recognize the user that spoke the utterance in the audio data 111 by comparing features/vectors of the user recognition feature/vector data 509 to training features/vectors (either received from the storage 704 or determined from training data 705 received from the storage 704).

The user recognition module 702 may include a scoring component 722 which determines respective scores indicating whether the input utterance (represented by user recognition feature/vector data 509) was spoken by particular users (represented by training data 705). The user recognition module 702 may also include a confidence component 724 which determines an overall confidence as the accuracy of the user recognition operations (such as those of the scoring component 722) and/or an individual confidence for each user potentially identified by the scoring component 722. The output from the scoring component 722 may include scores for all users with respect to which user recognition was performed (e.g., all users associated with the speech-controlled device 100a). For example, the output may include a first score for a first user, a second score for a second user, and third score for a third user, etc. Although illustrated as two separate components, the scoring component 722 and confidence component 724 may be combined into a single component or may be separated into more than two components.

The scoring component 722 and confidence component 724 may implement one or more trained machine learning models (such neural networks, classifiers, etc.) as known in the art. For example, the scoring component 722 may use probabilistic linear discriminant analysis (PLDA) techniques. PLDA scoring determines how likely it is that the input user recognition feature vector 509 corresponds to a particular training data feature vector 705 for a particular user. The PLDA scoring may generate similarity scores for each training feature vector considered and may output the list of scores and users and/or the user ID of the speaker whose training data feature vector most closely corresponds to the input user recognition feature vector 509 of the utterance. The scoring component 722 may also use other techniques such as GMMs, generative Bayesian models, or the like, to determine similarity scores.

The confidence component 724 may input various data including information about the ASR confidence 707, utterance length (e.g., number of frames or time of the utterance), audio condition/quality data (such as signal-to-interference data or other metric data), fingerprint data, image data, or other factors to consider how confident the user recognition module 702 is with regard to the scores linking users to the input utterance. The confidence component 724 may also consider the similarity scores and user IDs output by the scoring component 722. Thus, the confidence component 724 may determine that a lower ASR confidence 707, or poor input audio quality, or other factors, may result in a lower confidence of the user recognition module 702. Whereas a higher ASR confidence 707, or better input audio quality, or other factors, may result in a higher confidence of the user recognition module 702. Precise determination of the confidence may depend on configuration and training of the confidence component 724 and the models used therein. The confidence component 724 may operate using a number of different machine learning models/techniques such as GMM, neural networks, etc. For example, the confidence component 724 may be a classifier configured to map a score output by the scoring component 722 to a confidence.

The user recognition module 702 may output user recognition confidence data 711 specific to a single user. The user recognition confidence data 711 may include a particular score (e.g., 0.0-1.0, 0-1000, or whatever scale the system is configured to operate). Alternatively or in addition, the user recognition confidence data 711 may include a binned recognition indicator. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." Combined binned and confidence score outputs are also possible. The user recognition module 702 may also output a confidence value that the score/bin is correct, where the confidence value indicates how confident the user recognition module 702 is in the output results. This confidence value may be determined by the confidence component 724.

The confidence component 724 may determine individual user confidences and differences between user confidences when determining the user recognition confidence data 711. For example, if a difference between a first user's confidence score and a second user's confidence score is large, and the first user's confidence score is above a threshold, then the user recognition module 702 is able to recognize the first user as the user that spoke the utterance with a much higher confidence than if the difference between the users' confidences were smaller.

The user recognition module 702 may perform certain thresholding to avoid incorrect user recognition results being output. For example, the user recognition module 702 may compare a confidence score output by the confidence component 724 to a confidence threshold. If the confidence score is not above the confidence threshold (for example, a confidence of "medium" or higher), the user recognition module 702 may not output user recognition confidence data 711, or may only include in that data 711 an indication that a user speaking the utterance could not be verified. Further, the user recognition module 702 may not output user recognition confidence data 711 until enough user recognition feature/vector data 509 is accumulated and processed to recognize the user above a threshold confidence. Thus the user recognition module 702 may wait until a sufficient threshold quantity of audio data of the utterance has been processed before outputting user recognition confidence data 711. The quantity of received audio data may also be considered by the confidence component 724.

The user recognition module 702 may be defaulted to output binned (e.g., low, medium, high) user recognition confidence data 711. However, such may be problematic from the application server(s)125 perspective. For example, if the user recognition module 702 computes a single binned confidence for multiple users, the application server(s) 125 may not be able to determine which user to determine content with respect to. In this situation, the user recognition module 702 may be configured to override its default setting and output user recognition confidence data 711 including numeric values (e.g., 0.0-1.0) associated with the users associated with the same binned confidence. This enables the application server(s) 125 to select content associated with the user associated with the highest confidence value. The user recognition confidence data 711 may also include the user IDs corresponding to the potential user(s) who spoke the utterance.

The NLU results 357 may invoke multiple application servers 125 having access to content responsive to a spoken utterance. The processors/server(s) 352 may communicate with one or more of the application servers 125 without having to use a network(s) 330. Alternatively, the processors/server(s) 352 may communicate with one or more of the application servers 125 through a network(s) 330.

Each application server 125 may have a respective user recognition confidence threshold that must be satisfied prior to the application server 125 providing content responsive to the spoken utterance in the audio data 111. The application server(s) 125 may individually send a request for user recognition data to the user recognition module 702. Each request may include the user recognition confidence threshold of the application server 125 from which the request originated/was sent. Alternatively, a component of the processors/server(s) 352 may compile the user recognition confidence thresholds of all the application servers 125 invoked by a spoken utterance, and may send all the user recognition confidence thresholds to the user recognition module 702 in a single transmission. The user recognition confidence thresholds may be in the form of numeric confidence values (e.g., 0.0-1.0, 0-1000) or confidence indicators (e.g., low, medium, high). All of the user recognition confidence thresholds sent to the user recognition module 702 may be confidence values, all of the user recognition confidence thresholds sent to the user recognition module 702 may be in the form of confidence indicators, or some of the user recognition confidence thresholds sent to the user recognition module 702 may be in the form of confidence values while others are in the form of confidence indicators.

The user recognition module 702 may determine user recognition confidence data 711 with respect to all of the users indicated in the profile associated with the speech-controlled device 100*a*. The user recognition module 702 may then determine whether one or more users are associated with user recognition confidence data 711 satisfying a most stringent (e.g., highest) received user recognition confidence threshold. If the user recognition module 702 determines a single user is associated with user recognition confidence data 711 that meets or exceeds the highest user recognition confidence threshold, the user recognition module 702 sends the user recognition confidence data 711 to the application servers 125 from which the user recognition confidence thresholds were received.

If the user recognition module 702 does not determine a user associated with user recognition confidence data 711 that meets or exceeds the highest user recognition confidence threshold, the user recognition module 702 may cause speech-controlled device 100*a* (and/or a different devices indicated in profiles associated with the users indicated in the speech-controlled device's profile) to gather additional data usable for user recognition. Such additional data may include image data or video data that may be used for facial recognition, for example. Such additional data may also include biometric data such as retina image data captured using a retina scanner and used for retina verification. Moreover, such additional data may include biometric data such as fingerprint data captured using a fingerprint scanner and used for fingerprint verification. Other user identifying data may also be used. The user recognition module 702 may perform user recognition using additional data until the user recognition module 702 determines a single user (indicated in the profile associated with the speech-controlled device 100*a*) associated with user recognition confidence data 711 that meets or exceeds the highest user recognition confidence threshold. Likewise, if the user recognition module 702 determines more than one user associated with user recognition confidence data 711 that meets or exceeds the highest user recognition confidence threshold, the user recognition module 702 uses additional data (described above) to perform user recognition until only a single user is associated with user recognition confidence data 711 that meets or exceeds the highest user recognition confidence threshold.

In addition, the user recognition module 702 may use secondary data 709 to inform user recognition processing. Thus, a trained model or other component of the user recognition module 702 may be trained to take secondary data 709 as an input feature when performing recognition. Secondary data 709 may include a wide variety of data types depending on system configuration and may be made available from other sensors, devices, or storage such as user profile data, etc. The secondary data 709 may include a time of day at which the audio data was captured, a day of a week in which the audio data was captured, the text data 367, and/or the NLU results 357.

The processors/server(s) 352 may receive the secondary data 709 from various devices local to the user (e.g., the speech-controlled device 100a, a smart phone, a biometric sensor, etc.). The secondary data 709 received may depend upon the situation of the user's environment. For example, if multiple individuals are located proximate to the devices(s) (e.g., as determined by multiple individuals being located within a field of view of the camera 314 or based on multiple individuals' voices being detected in audio data captured by the microphone 308), the processors/server(s) 352 may receive secondary data 709 corresponding to a passcode, biometric content, or other content that may not be overheard/overseen by the other individuals. The passcode may be provided via a touch interface of a smart device (such as a smart phone, tablet, etc.). The biometric content may be a fingerprint captured by a fingerprint scanner, an image(s) of a retina captured by a retina scanner, etc. In another example, if multiple individuals are located around the user, the secondary data 709 may only be a portion of a passcode. A user profile may indicate an alphanumeric passcode and the processors/server(s) 352 (or another device) may solicit only a portion (e.g., the third digit) of the passcode from the user. These techniques may be beneficial if it is determined that multiple individuals are present because it allows the user to provide useful verification data without having the user divulge confidential information to unauthorized individuals.

Each form of secondary data 709 (e.g., image data for retina verification, passcode data, etc.) may be associated with a respective score/weight, or generally the determined confidence data 711 may depend on the available forms of secondary data and their respective scores, if any. For example, a user recognition performed using retina scan data may increase a confidence data, but the amount of increase may depend on a score associated with the retina scan data (e.g., a score from a retina scan component that produces retina scan data). Thus, it should be appreciated that different forms of secondary data 709 may affect user recognition determinations differently.

A profile associated with each user may include reference secondary data (i.e., reference retina image data, reference fingerprint image data, etc.) to which captured secondary data 709 is compared for purposes of user recognition. Moreover, each user profile may include reliability weight information associated with each type of secondary data 709. The reliability weight information may be specific to the device configured to capture the secondary data. For example, if the user has two different retina scanners, a first retina scanner may have be associated with a first reliability weight and a second retina scanner may be associated with a second reliability weight. If the user recognition module 702 determines initial user recognition confidence data 711 that does not satisfy the most stringent user recognition confidence threshold, the user recognition module 702 may cause secondary data 709 to be captured thereafter, and may use the secondary data 709 to determine updated user recognition confidence data 711.

In one example, secondary data 709 may include image data or video data. For example, facial recognition may be performed on image data or video data received from the speech-controlled device 100a from which the audio data 111 was received. Facial recognition may be performed by the user recognition module 702, or another component of the processors/server(s) 352. The output of the facial recognition process may be used by the user recognition module 702. That is, facial recognition output data may be used in conjunction with the comparison of the features/vectors of the audio data 111 and training data 705 to perform more accurate user recognition. Thus, while training data 705 may be based on speech samples of a user, the training data 705 may also be based on other data such as image data corresponding to known pictures of the user, retina scan data corresponding to the user, fingerprint data, etc.

The secondary data 709 may also include location data of the speech-controlled device 100a. The location data may be specific to a building within which the speech-controlled device 100a is located. For example, if the speech-controlled device 100a is located in user A's bedroom, such location may increase user recognition confidence data associated with user A, but decrease user recognition confidence data associated with user B.

The secondary data 709 may further include type data indicating a type of the speech-controlled device 100a. Different types of speech-controlled devices may include, for example, a smart watch, a smart phone, a tablet computer, and a vehicle. The type of the speech-controlled device 100a may be indicated in a profile associated with the speech-controlled device 100a. For example, if the speech-controlled device 100a from which the audio data 111 was received is a smart watch or vehicle belonging to user A, the fact that the speech-controlled device 100a belongs to user A may increase user recognition confidence data associated with user A, but decrease user recognition confidence data associated with user B.

The secondary data 709 may additionally include geographic coordinate data associated with the speech-controlled device 100a. For example, a profile associated with a vehicle may indicate multiple users (e.g., user A and user B). The vehicle may include a global positioning system (GPS) indicating latitude and longitude coordinates of the vehicle when the audio data 111 is captured by the vehicle. As such, if the vehicle is located at a coordinate corresponding to a work location/building of user A, such may increase user recognition confidence data associated with user A, but decrease user recognition confidence data of all other users indicated in the profile associated with the vehicle. Global coordinates and associated locations (e.g., work, home, etc.) may be indicated in a user profile associated with the speech-controlled device 100a. The global coordinates and associated locations may be associated with respective users in the user profile.

The secondary data 709 may also include other data/signals about activity of a particular user that may be useful in performing user recognition of an input utterance. For example, if a user has recently entered a code to disable a home security alarm, and the utterance corresponds to a device at the home, signals from the home security alarm about the disabling user, time of disabling, etc. may be reflected in the secondary data 709 and considered by the user recognition module 702. If a mobile device (such as a phone, Tile, dongle, or other device) known to be associated with a particular user is detected proximate to (for example physically close to, connected to the same Wi-Fi network as, or otherwise nearby) the speech-controlled device 100a, this may be reflected in the secondary data 709 and considered by the user recognition module 702.

Depending on system configuration, the secondary data 709 may be configured to be included in the vector representation of the user recognition feature/vector data 509 (for example using encoder 650) so that all the data relating to the utterance to be processed by the scoring component 722 may be included in a single vector. Alternatively, the secondary data 709 may be reflected in one or more different data structures to be processed by the scoring component 722.

As shown in FIG. 7, the ASR module 358 may output text data 367, which in turn is processed by the NLU component 360. The results 357 of NLU processing performed by the NLU module 360 and the user recognition confidence data 711 output by the user recognition module 702 may be sent to one or more applications, represented by application server(s) 125. The NLU results 357 and the user recognition confidence data 711 may be sent simultaneously (i.e., in a single transmission) to the application server(s) 125 via an application program interface (API). Alternatively, the NLU results 357 and the user recognition confidence data 711 may be sent in consecutive transmissions to the application server(s) 125 via the API. The application server(s) 125 that receives the NLU results 357 and the user recognition confidence score data 711 may be determined by the processors/server(s) 352 as corresponding to content responsive to the utterance in the audio data 111. For example, if the audio data 111 includes the utterance "Play my music," the NLU results 357 and user recognition confidence data 711 may be sent to a music playing application server 125. If user recognition confidence data 711 associated with a single user is passed to the application server(s) 125, the application server(s) 125 may identify content responsive to the utterance and associated with the user. If, instead, user recognition confidence score data 711 associated with multiple users is passed to the application server(s) 125, the application server(s) 125 may identify content responsive to the utterance and associated with the user associated with the highest recognition confidence.

The API used to pass the user recognition confidence data 711 to the application server(s) 125 may allow the application server(s) 125 to receive various information such a user ID as well as a confidence value corresponding to the user ID, such as a numeric value or binned value as discussed herein. The API may also pass data corresponding to or representing the confidence value such as a binned value discussed herein or other data, numeric or otherwise representing the confidence. The API may also pass other data such as a source of user recognition data (e.g., whether the system recognized the user using speech analysis, a passcode, a passphrase, a fingerprint, biometric data, etc. or some combination thereof). The API may also pass data such as other user profile information, a speech session identifier (so the various components can track the speech session corresponding to the data) or other information. The speech session identifier may correspond to an utterance spoken by a user and/or to an ongoing exchange between the system and the user (such as a dialog of multiple utterances) to exchange information for executing a command. The API, or one or more other APIs, may also be used to exchange the user recognition confidence thresholds sent from the application server(s) 125 to the user recognition module 702 as well as other data such as requested specific sources of user recognition data, user IDs, speech session IDs, requested content data, or other information to be exchanged for purposes of processing a speech command/session.

Various machine learning techniques may be used to train and operate models to perform various steps described above, such as user recognition feature extraction, encoding, user recognition scoring, user recognition confidence determination, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Different content sources may require different user recognition confidence level thresholds be satisfied prior to creating/releasing user specific content. For example, if a user says "What is my bank account balance", an output of the system may ultimately be "Hello John, your Bank A account balance is $500." The portion of the output corresponding to "Hello John" may be created by a TTS content source that requires a user recognition confidence threshold of "low" be satisfied since potentially speaking the wrong user's name in a greeting is not necessarily problematic from a confidentiality perspective. In contrast, the portion of the output corresponding to "your Bank A account balance is $500" may be created using output from a banking content source (e.g., an application server 125) that requires a user recognition confidence threshold of "high" be satisfied because divulging a bank and an account balance of a user to a wrong user is highly problematic from a confidentiality perspective.

Moreover, a single content source may require different user recognition confidence level thresholds be satisfied based on the type/kind of content to be released. For example, a banking application may be configured to create/release bank branch information (e.g., branch locations and times of operation). The banking application may also be configured to release bank account information. The banking application may require a user recognition confidence level of "low" be satisfied to release bank branch information, but may require a user recognition confidence level of "high" be satisfied to release user specific bank account information.

Figure 8:
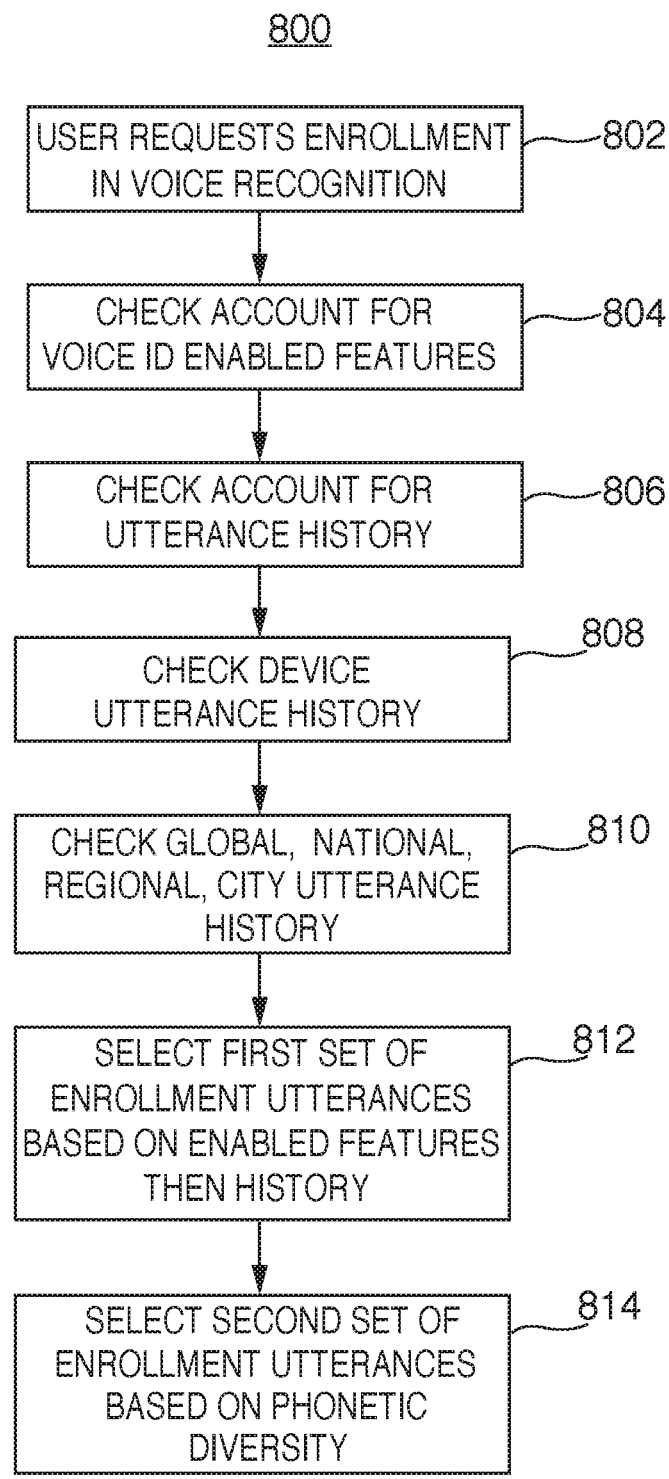
FIG. 8 is a process for establishing an identity profile of an individual utilizing spoken text, in accordance with various embodiments.

FIG. 8 is an illustrative diagram of a process 800 for enrolling a new user in voice recognition. In some embodiments, process 800 may begin at step 802, whereby an individual user such as individual 1 shown in FIG. 1 requests enrollment in voice recognition. This request may be made through a companion app that is related to electronic device 100a. Alternatively, this request could be made through voice activated commands made directly to device 100a. Once initiated, in step 804, a determination is made as to whether the enrolling user has a user account. If the user has an individual account, then in step 806, an inquiry is made using the account to gather historical information that might improve the quality of future voice recognition attempts. For example, information related to prior utterance use may be available such as specific utterances commonly utilized by that individual, types of utterances used (e.g., does the individual shop a lot, or order food often, of have a music library that is accessed often, or a selection of audio books that is accessed with some regularity, etc.).

Whatever account-related information can be obtained in step 806 is stored and processing moves to step 808 (which follows step 804 in the event that the user does not have an individual account). In step 808, an inquiry similar to that made during step 806 is made with respect to the device through which enrollment is occurring. For example, sample recent history of utterances made using the particular device 100a may be compiled in order to select relevant utterances for the custom enrollment process. Once the device-specific information has been collected, the process moves to step 810, where geographic-based utterance historical information can be accessed and compiled. Information obtained in step 810 may be particularly helpful in instances where a user does not have an individual user account and the amount of information available from the device is minimal. Geographic-based utterance information might include, for example, common utterances on a global, national, regional, state, city, or even neighborhood basis.

Once the historical information has been gathered and analyzed, a first set of content specific utterances can be selected, in step 812, from one or more groups of known utterances. The selection process is focused, at least in part, on selecting enrollment utterances that the enrollee has already successfully used with at least some frequency, which further improves the chances that the Selected Enrollment Vector will be created in a highly accurate manner, which therefore, would greatly improve quality of future voice recognition attempts. Once content specific utterances have been selected, or in some instances at the same time as they are being selected, a second set of utterances related specifically to phonetic coverage are selected in step 814. The selection of phonetic utterances are intended to compliment the selection of content based utterances such that the combination results a voice recognition system that performs in a highly accurate manner, in part, because the users using the system have already become accustomed to successfully utilizing many of the utterances in the set of utterances selected for enrollment.

Once a complete set of utterances is selected, the utterances are processed by text to speech module 364 and provided to device 100a for playback and, in this case, recording. The recordings of the spoken selected utterances are then processed into a Selected Enrollment Vector for the enrollee and stored in an account related to that user for access during future voice recognition matching operations.

FIG. 9 is an illustrative diagram of a process for utilizing voice recognition, in accordance with various embodiments. In some embodiments, process 900 may begin at step 902. In step 902, an utterance is received by an electronic device, such as device 100a. The electronic device converts the utterance into digital audio data that represents the utterance and transmits the digital audio data, in step 904, to a language processing system such as language processing system 300. The language processing system receives the audio data, which is converted to text data by automatic speech recognition (ASR) processing in step 906, which analyses the audio data to determine which words are present in the audio data. The digital audio data is also processed in step 908 (steps 906 and 908 can occur in any sequence, or simultaneously) into an audio input vector for voice recognition analysis.

In step 910, the user account that is associated with the electronic device (such as device 100a) is accessed in order to determine whether any voice recognition vectors (i.e., the Selected Enrollment Vectors) have been established for that account. In step 912, whatever voice recognition vectors that exist for the specific user account are retrieved. In step 914, each of the retrieved stored voice recognition vectors is matched with the audio input voice vector and a determination is made, in step 916, as to whether the attempted match exceeds a threshold score representing a successful match. If any stored individual user voice recognition vector match exceeds the predetermined threshold, processing proceeds at step 918 based on the utterance being provided by the identified user. Otherwise, processing continues in step 920 as if voice recognition was not available and the individual who spoke the utterance is not known.

The various embodiments of the invention may be implemented by software, but may also be implemented in hardware, or in a combination of hardware and software. The invention may also be embodied as computer readable code on a computer readable medium. The computer readable medium may be any data storage device that may thereafter be read by a computer system.

The above-described embodiments of the invention are presented for purposes of illustration and are not intended to be limiting. Although the subject matter has been described in language specific to structural feature, it is also understood that the subject matter defined in the appended claims is not necessarily limited to the specific features described. Rather, the specific features are disclosed as illustrative forms of implementing the claims.

What is claimed is:

1. A computer-implemented method comprising:
   determining a user account associated with a user device being used for enrollment in voice recognition functionality;
   accessing stored data associated with the user account, the stored data corresponding to a plurality of historical utterances that were determined to be used regularly with the user device within a temporal window;
analyzing the plurality of historical utterances for phonetic diversity;
selecting a first enrollment utterance from the plurality of historical utterances based on the phonetic diversity;
sending, to the user device, a first request that a user speak the first enrollment utterance;
receiving, from the user device, first enrollment audio data that is representative of the first enrollment utterance being spoken;
processing the first enrollment audio data to determine a speaker profile representative of the user's voice;
sending, to the user device, a second request that the user speak the first enrollment utterance;
receiving, from the user device, second enrollment audio data that is representative of the first enrollment utterance being spoken; and
processing the second enrollment audio data to determine a modified speaker profile.

2. The method of claim 1, wherein sending the first request comprises:
causing the first utterance to be displayed on a display screen of the user device.

3. The method of claim 1, further comprising:
receiving, from the user device, first input audio data representing a first utterance;
generating, using automatic speech recognition (ASR) processing, text data representing the first input audio data; and
determining, using natural language understanding (NLU) processing and the text data, that the first utterance comprises an intent to enroll in voice recognition functionality, and
wherein the first request and the second request are sent to the user device as audio output data for playback to the user.

4. The method of claim 1, wherein sending, to the user device, the first request comprises:
generating, using text-to-speech processing, first audio output representing the first enrollment utterance, and
sending the first audio output to the user device for playback; and the method further comprises:
receiving the first enrollment audio data;
generating, using ASR processing, first text data based on the first enrollment audio data; and
determining the speaker profile based, at least in part, on the first text data and the first enrollment audio data.

5. The method of claim 4, further comprising:
generating, using text-to-speech processing, second audio output representing an additional enrollment utterance selected from the set of enrollment utterances;
sending the second audio output to the user device for playback;
receiving third enrollment audio data, from the user device, the third enrollment audio data representative of the additional enrollment utterance being spoken;
generating, using ASR processing, second text data based on the third enrollment audio data;
determining a modified speaker profile based, at least in part, on the second text data and the third enrollment audio data; and
determining that the modified speaker profile exceeds a predetermined threshold.

6. The method of claim 1, further comprising:
accessing the stored data comprising a plurality of previously used utterances;
analyzing the plurality of previously used utterances for phonetic diversity; and
determining a set of enrollment utterances by selecting a subset of the plurality of previously used utterances based on providing phonetic diversity during enrollment in a voice-based speaker identification system.

7. The method of claim 6, wherein determining the set of enrollment utterances comprises:
selecting a second enrollment utterance for the set of enrollment utterances based on an association between the second enrollment utterance and a first domain;
selecting a third enrollment utterance for the set of enrollment utterances based on an association between the third enrollment utterance and a second domain;
selecting a fourth enrollment utterance for the set of enrollment utterances based on an association between the fourth enrollment utterance and a third domain; and
selecting a fifth enrollment utterance for the set of enrollment utterances based on phonetic diversity as compared to the second, third and fourth enrollment utterances.

8. The method of claim 1, further comprising:
accessing contact data associated with the user account;
determining a second enrollment utterance using the contact data;
sending, to the user device, a third request that the user speak the second enrollment utterance;
receiving, from the user device, third enrollment audio data representative of the second enrollment utterance being spoken by the user; and
processing the third enrollment audio data to determine a second speaker profile corresponding to the contact data.

9. A system comprising:
communications circuitry;
at least one processor; and
at least one memory including instructions that, when executed by the at least one processor, cause the system to:
receive a set of enrollment utterances selected from a plurality of sets of enrollment utterances, wherein at least one enrollment utterance of the set of enrollment utterances is based on providing phonetic diversity during enrollment in a voice-based speaker identification system;
select a first enrollment utterance from the set of enrollment utterances based on an association between the first enrollment utterance and a first domain;
send, to a user device, a first request that a user speak the first enrollment utterance;
receive, from the user device, first enrollment audio data that is representative of the first enrollment utterance being spoken;
process the first enrollment audio data to determine a speaker profile representative of the user's voice;
send, to the user device, a second request that the user speak the first enrollment utterance;
receive second enrollment audio data from the user device that is representative of the first enrollment utterance being spoken;
process the second enrollment audio data to determine a first modified speaker profile;

determine that, based on the second enrollment audio data, the quality of the speaker profile exceeds a threshold;

determine that an additional enrollment utterance from the set of enrollment utterances is phonetically diverse from the first enrollment utterance;

select the additional enrollment utterance based on an association between the additional enrollment utterance and a second domain;

send a third request that the user speak the additional enrollment utterance;

receive additional enrollment audio data from the voice-activated device that is representative of the additional enrollment utterance being spoken; and process the additional enrollment audio data to determine a second modified speaker profile.

10. The system of claim 9, wherein the instructions that, when executed, cause the system to send the first request comprise instructions that, when executed, further cause the system to:

cause the first enrollment utterance to be displayed on a display screen of the user device.

11. The system of claim 9, further comprising instructions that, when executed by the at least one processor, further cause the system to:

receiving, from the user device, first input audio data representing a first utterance;

generating, using automatic speech recognition (ASR) processing, text data representing the first input audio data; and determining, using natural language understanding (NLU) processing and the text data, that the first utterance comprises an intent to enroll in voice recognition functionality, and wherein the first request, the second request, and the third request are sent to the user device as audio output data for playback to the user.

12. The system of claim 9, further comprising instructions that, when executed by the at least one processor, further cause the system to:

generate, using text-to-speech processing, first audio output representing the first enrollment utterance;

send the first audio output to the user device for playback;

receive the first enrollment audio data;

generate, using ASR processing, first text data based on the first enrollment audio data; and determine the speaker profile based, at least in part, on the first text data and the first enrollment audio data.

13. The system of claim 12, further comprising instructions that, when executed by the at least one processor, further cause the system to:

generate, using text-to-speech processing, a second audio output representing the additional enrollment utterance;

send the second audio output to the user device for playback;

receive the additional enrollment audio data representative of the additional enrollment utterance being spoken;

generate, using ASR processing, second text data from the additional enrollment audio data;

determine a modified speaker profile based, at least in part, on the second text data and the additional enrollment audio data; and determine, that the modified speaker profile exceeds a predetermined threshold.

14. The system of claim 9, wherein the instructions that, when executed, cause the system to receive the set of enrollment utterances comprise instructions that, when executed, further cause the system to:

access stored data comprising a plurality of previously used utterances;

analyze the plurality of previously used utterances; and select a subset of the plurality of previously used utterances as part of the set of enrollment utterances.

15. The system of claim 9, wherein the instructions that, when executed, cause the system to the set of enrollment utterances comprise instructions that, when executed, further cause the system to:

determine a user account associated with the user device being used for enrollment in voice recognition functionality;

access stored data associated with the user account to determine a plurality of historical utterances that were used with the user device within a predetermined temporal window;

analyze the plurality of historical utterances for phonetic diversity; and select at least one historical utterance from the plurality of historical utterances for inclusion in the set of enrollment utterances.

16. The system of claim 9, further comprising instructions that, when executed by the at least one processor, further cause the system to:

access contact data associated with a user account corresponding to the user;

determine a second enrollment utterance using the contact data;

send a fourth request that the user speak the second enrollment utterance;

receive second enrollment audio data representative of the second enrollment utterance being spoken; and process the second enrollment audio data to determine a second speaker profile corresponding to the contact data.

* * * * *